US009069377B2

(12) United States Patent
Wilson et al.

(10) Patent No.: US 9,069,377 B2
(45) Date of Patent: Jun. 30, 2015

(54) SYSTEM AND METHOD FOR INTERFACING BETWEEN A MOBILE DEVICE AND A PERSONAL COMPUTER

(75) Inventors: Sean E. Wilson, Kitchener (CA); David P. Yach, Waterloo (CA); Kevin H. Orr, Elmira (CA); Steven H. Fyke, Waterloo (CA); Andrew D. Bocking, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1427 days.

(21) Appl. No.: 12/033,194

(22) Filed: Feb. 19, 2008

(65) Prior Publication Data

US 2009/0075697 A1    Mar. 19, 2009

Related U.S. Application Data

(60) Provisional application No. 60/972,138, filed on Sep. 13, 2007.

(51) Int. Cl.
| | | |
|---|---|---|
| *H04B 1/38* | (2006.01) | |
| *G06F 3/01* | (2006.01) | |
| *A01G 23/04* | (2006.01) | |
| *B66F 9/18* | (2006.01) | |

(52) U.S. Cl.
CPC  *G06F 3/01* (2013.01); *A01G 23/04* (2013.01); *B66F 9/18* (2013.01)

(58) Field of Classification Search
CPC ..... H04L 67/04; H04L 67/2823; H04L 67/02; H04L 12/4641; H04L 12/581; H04L 12/5895; H04L 51/04; H04L 51/38; H04L 61/2076; H04L 67/36; H04L 69/24; H04L 41/22; H04L 29/12301; H04L 29/12311; H04L 61/2084; H04L 65/40
USPC .............. 455/414.1, 420, 411, 454, 466, 456, 455/422.1, 457; 370/252, 402, 466, 338, 370/310, 259, 401, 328; 709/202, 219, 225, 709/227, 229, 217, 218, 203; 705/3, 2, 10
See application file for complete search history.

(56) References Cited

U.S. PATENT DOCUMENTS

| | | |
|---|---|---|
| 6,170,007 B1 | 1/2001 | Venkatraman et al. |
| 6,519,241 B1 | 2/2003 | Theimer |

(Continued)

FOREIGN PATENT DOCUMENTS

WO    WO 02/087161 A1    10/2002

OTHER PUBLICATIONS

Hartwig, S. et al.; "Wireless Microservers"; IEEE Pervasive Computing; Apr. 1, 2002; vol. 1, No. 2; pp. 58 to 66; IEEE Service Center; Los Alamitos, CA, U.S.A.

(Continued)

*Primary Examiner* — Sujatha Sharma
(74) *Attorney, Agent, or Firm* — Fleit Gibbons Gutman Bongini & Bianco P.L.

(57) ABSTRACT

A system and method are provided for interfacing between a mobile device and a PC. The mobile device utilizes a connection with the PC for taking advantage of the larger display and input devices such as the keyboard on the PC to improve the user interface (UI). This also enables the user to take advantage of the mobile device's wireless connectivity at the same time, e.g. where the PC does not have the same connectivity.

36 Claims, 16 Drawing Sheets

(56) References Cited

U.S. PATENT DOCUMENTS

| | | |
|---|---|---|
| 6,947,975 B2 | 9/2005 | Wong |
| 6,976,226 B1 | 12/2005 | Strong |
| 7,185,360 B1* | 2/2007 | Anton et al. .................. 726/3 |
| 8,150,452 B2* | 4/2012 | Liang ...................... 455/550.1 |
| 8,254,991 B1* | 8/2012 | Biere et al. ................. 455/557 |
| 2002/0187775 A1* | 12/2002 | Corrigan et al. ............ 455/414 |
| 2003/0028612 A1 | 2/2003 | Lin et al. |
| 2006/0026198 A1* | 2/2006 | Emery et al. ............. 707/103 R |
| 2008/0021741 A1* | 1/2008 | Holla et al. ................... 705/3 |
| 2008/0220760 A1* | 9/2008 | Ullah ......................... 455/420 |
| 2008/0299953 A1* | 12/2008 | Rao .......................... 455/414.1 |
| 2009/0300066 A1* | 12/2009 | Guo et al. ................. 707/104.1 |
| 2013/0238165 A1* | 9/2013 | Garrett et al. ................... 701/2 |

OTHER PUBLICATIONS

Korbler, Gunther; European Search Report, completed May 19, 2009, received by applicant May 29, 2009.

Product, dotPocket 2003, viewed Mar. 7, 2008, <http://www.dotpocket.com/pocket-pc-software.html>.

* cited by examiner

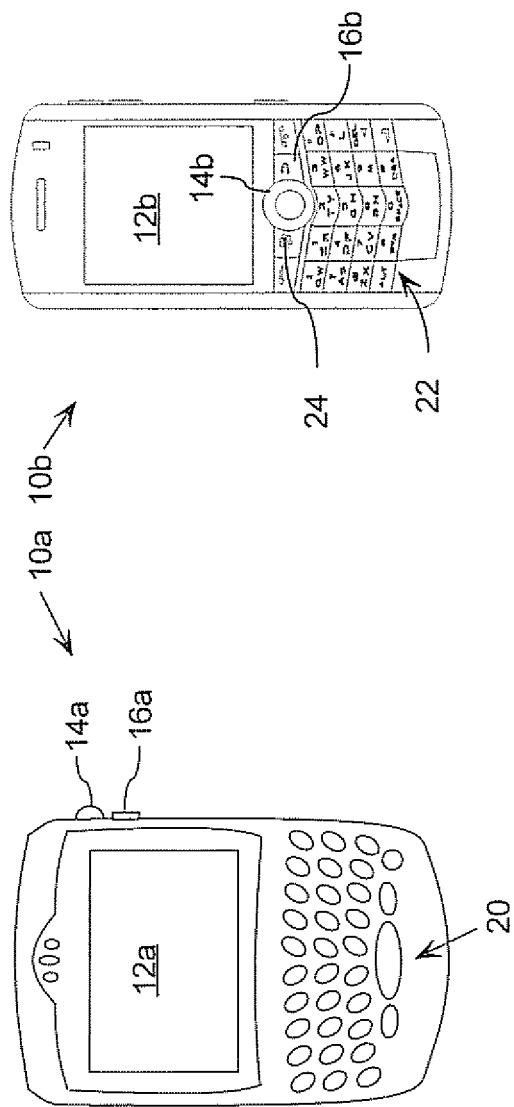

SYSTEM AND METHOD FOR INTERFACING BETWEEN A MOBILE DEVICE AND A PERSONAL COMPUTER

This application claims priority from U.S. Application No. 60/972,138 filed on Sep. 13, 2007 the contents of which are incorporated herein by reference.

TECHNICAL FIELD

The following relates to systems and methods for interfacing between a mobile device and a personal computer (PC).

DESCRIPTION OF THE PRIOR ART

Mobile devices have become a common and often preferred way to communicate. However, for a mobile device to be conveniently portable, i.e. 'mobile', there are inherent limitations in the size of the input and display mechanisms such as the display screen and keyboard.

When using a mobile device to read and prepare (type) electronic messages such as for email and instant messaging, the process can be time consuming and error prone. Where the user enters lengthy messages, this is even greater. Moreover, the limited display size can make it difficult to review what has been typed before you send the message. Such limitations can lead to errors in the messages as well as less than desirable formatting. Since mobile devices are often used for conducting business while out of the office, these limitations can be problematic for the user.

Current solutions that exist for utilizing mobile device data on an external device such as a personal computer require that data to be used on the external device be transferred from the mobile device to the external device and a custom program be executed on the external device for using the transferred data. This can require significant programming effort to ensure that the external device has a program which can handle the data transferred from the mobile device, and the transfer of data itself can be a burden and negatively affect the usability of such a solution.

BRIEF DESCRIPTION OF THE DRAWINGS

Embodiments will now be described by way of example only with reference to the appended drawings wherein:

FIG. 1 is a schematic diagram of a mobile device and a display screen therefor.

FIG. 2 is a schematic diagram of another mobile device and a display screen therefor.

DETAILED DESCRIPTION OF THE DRAWINGS

Figure 3:
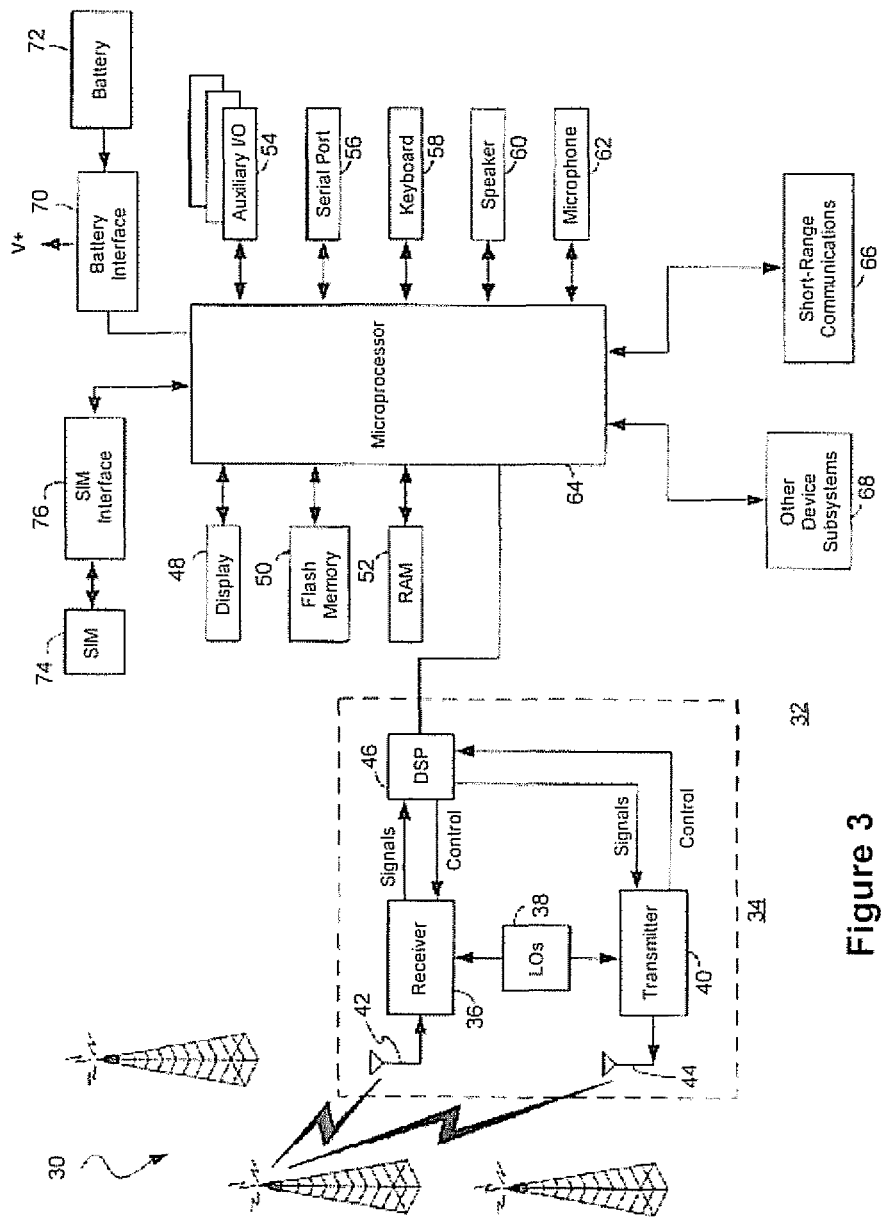
FIG. 3 is a schematic block diagram of components of the mobile device of any or both of FIGS. 1 and 2.

It has been recognized that to overcome limitations imposed by the often limited display size on a mobile device 10, existing display and input/output capabilities of an external computing device 200, e.g. a personal computer (PC), which are typically larger than those on a mobile device 10 can be utilized. Similarly, the wireless communication capabilities of the mobile device 10 can be harnessed by the user while taking, advantage of the computing device's input/output facilities. As will be explained below, a connection 202 between the mobile device 10 and external computing device 200 can enable the display and features provided on the mobile device 10 to be mirrored, accessed or simulated on the external computing device 200, which in turn enables the user to take advantage of the familiar and more convenient display and input mechanisms offered by the external computing device 200. Moreover, as will be shown below, the connection 202 enables a user to update and change settings on their mobile device 10 trough their external computing device 200.

By providing a mobile server 220 on the mobile device 10, the mobile device 10 can act as or mimic a known provider, host, server or other entity of content such that existing programs on the external computing device 200 (e.g. a browser, email client etc.) can be used while requiring little if any additional software or programming at the external computing device side. In this way, the existing programs can access information as if they are communicating with a known entity, server or host but instead utilizing information stored on and available from the mobile device 10. Several configurations are shown and described, which address different overall system requirements and which may suit different applications.

Referring now to FIGS. 1 and 2, one embodiment of a mobile device 10a is shown in FIG. 1 and another embodiment of a mobile device 10b is shown in FIG. 2. It will be appreciated that the numeral "10" will hereinafter refer to any mobile device 10, including the embodiments 10a and 10b. It will also be appreciated that a similar numbering convention may be used for other general features common between FIGS. 1 and 2 such as a display 12, a positioning device 14, and a cancel or escape button 16.

The mobile device 10a shown in FIG. 1 comprises a display 12a and the cursor or view positioning device 14 shown in this embodiment is a positioning wheel 14a. Positioning device 14 may serve as another input member and is both rotatable to provide selection inputs to the processor 64 (see FIG. 3) and can also be pressed in a direction generally toward housing to provide another selection input to the processor 64. The display 12 may include a selection cursor 18 that depicts generally where the next input or selection will be received. The selection cursor 18 may comprise a box, alteration of an icon or any combination of features that enable the user to identify the currently chosen icon or item. The mobile device 10a in FIG. 1 also comprises an escape or cancel button 16a and a keyboard 20. In this example, the keyboard 20 is disposed on the front face of the mobile device housing and positioning device 14 and cancel button 16a are disposed at the side of the housing to enable a user to manoeuvre the positioning wheel 16a while holding the mobile device 10 in one hand. The keyboard 20 is in this embodiment a standard QWERTY keyboard.

The mobile device 10b shown in FIG. 2 comprises a display 12b and the positioning device 14 in this embodiment is a trackball 14b. Trackball 14b permits multi-directional positioning of the selection cursor 18 such that the selection cursor 18 can be moved in an upward direction, in a downward direction and, if desired and/or permitted, in any diagonal direction. The trackball 14b is preferably situated on the front face of a housing for mobile device 10b as shown in FIG. 2 to enable a user to manoeuvre the trackball 14b while holding the mobile device 10b in one hand. The trackball 14b may serve as another input member (in addition to a directional or positioning member) to provide selection inputs to the processor 64 and can preferably be pressed in a direction towards the housing of the mobile device 10b to provide such a selection input.

The mobile device 10b also comprises a menu or option button 24 that loads a menu or list of options on display 12b when pressed, and a cancel or escape button 16b to exit, "go back" or otherwise escape from a feature, option, selection or display. The mobile device 10b as illustrated in FIG. 2, comprises a reduced QWERTY keyboard 22. In this embodiment, the keyboard 22, positioning device 14, escape button 16b and menu button 24 are disposed on a front face of a mobile device housing.

The reduced QWERTY keyboard 22 comprises a plurality of multi-functional keys and corresponding indicia including keys associated with alphabetic characters corresponding to a QWERTY array of letters A to Z and an overlaid numeric phone key arrangement. The plurality of keys that comprise alphabetic and/or numeric characters total fewer than twenty-six (26). In the embodiment shown, the number of keys that comprise alphabetic and numeric characters is fourteen (14). In this embodiment, the total number of keys, including other functional keys, is twenty (20). The plurality of keys may comprise four rows and five columns of keys, with the four rows comprising in order a first, second, third and fourth row, and the five columns comprising in order a first, second, third, fourth, and fifth column. The QWERTY array of letters is associated with three of the four rows and the numeric phone key arrangement is associated with each of the four rows.

The numeric phone key arrangement is associated with three of the five columns. Specifically, the numeric phone key arrangement may be associated with the second, third and fourth columns. The numeric phone key arrangement may alternatively be associated with keys in the first, second, third, and fourth rows, with keys in the first row including a number "1" in the second column, a number "2" in the third column, and a number "3" in the fourth column. The numeric phone keys associated with keys in the second row include a number "4" in the second column, a number "5" in the third column, and a number "6" in the fourth column. The numeric phone keys associated with keys in the third row include a number "7" in the second column, a number "8" in the third column, and a number "9" in the fourth column. The numeric phone keys associated with keys in the fourth row may include a "*" in the second column, a number "0" in the third column, and a "#" in the fourth column.

The physical keyboard may also include a function associated with at least one of the plurality of keys. The fourth row of keys may include an "alt" function in the first column, a "next" function in the second column, a "space" function in the third column, a "shift" function in the fourth column, and a "return/enter" function in the fifth column.

The first row of five keys may comprise keys corresponding in order to letters "QW", "ER", "TY", "UI", and "OP". The second row of five keys may comprise keys corresponding in order to letters "AS", "DF", "GH", "JK", and "L". The third row of five keys may comprise keys corresponding in order to letters "ZX", "CV", "BN", and "M".

It will be appreciated that for the mobile device 10, a wide range of one or more positioning or cursor/view positioning mechanisms such as a touch pad, a joystick button, a mouse, a touchscreen, set of arrow keys, a tablet, an accelerometer (for sensing orientation and/or movements of the mobile device 10 etc.), or other whether presently known or unknown may be employed. Similarly, any variation of keyboard 20, 22 may be used. It will also be appreciated that the mobile devices 10 shown in FIGS. 1 and 2 are for illustrative purposes only and various other mobile devices 10, presently known or unknown are equally applicable to the following examples.

Movement, navigation, and/or scrolling with use of a cursor/view positioning device 14 (e.g. trackball 14b or positioning wheel 14a) is beneficial given the relatively large size of visually displayed information and the compact size of display 12, and since information and messages are typically only partially presented in the limited view of display 12 at any given moment. As previously described, positioning device 14—positioning wheel 14a and trackball 14b, are helpful cursor/view positioning mechanisms to achieve such movement. Positioning device 14, which may be referred to as a positioning wheel or scroll device 14a in one embodiment (FIG. 1), specifically includes a circular disc which is rotatable about a fixed axis of housing and may be rotated by the end user's index finger or thumb. As noted above, in another embodiment (FIG. 2) the trackball 14b comprises a multi-directional member that enables upward, downward and if desired, diagonal movements. The multi-directional movements afforded, in particular, by the trackball 14b and the presentation of icons and folders on display 12 provides the user with flexibility and familiarity of the layout of a traditional desktop computer interface. Also, the positioning device 14 enables movement and selection operations to be executed on the mobile device 10 using one hand. The trackball 14b in particular also enables both one-handed use and the ability to cause a cursor 18 to traverse the display 12 in more than one direction.

FIG. 3 is a detailed block diagram of a preferred mobile station 32 of the present disclosure. The term "mobile station" will herein refer to the operable components of, e.g. mobile device 10. Mobile station 32 is preferably a two-way communication device having at least voice and advanced data communication capabilities, including the capability to communicate with other computer systems. Depending on the functionality provided by mobile station 32, it may be referred to as a data messaging device, a two-way pager, a cellular telephone with data messaging capabilities, a wireless Internet appliance, or a data communication device (with or without telephony capabilities)—e.g. mobile device 10 shown in FIGS. 1 and 2. Mobile station 32 may communicate with any one of a plurality of fixed transceiver stations 30 within its geographic coverage area.

Mobile station 32 will normally incorporate a communication subsystem 34 which includes a receiver 36, a transmitter 40, and associated components such as one or more (preferably embedded or internal) antenna elements 42 and 44, local oscillators (LOs) 38, and a processing module such as a digital signal processor (DSP) 46. As will be apparent to those skilled in field of communications, particular design of communication subsystem 34 depends on the communication network in which mobile station 32 is intended to operate.

Mobile station 32 may send and receive communication signals over a network after required network registration or activation procedures have been completed. Signals received by antenna 44 through the network are input to receiver 36, which may perform such common receiver functions as signal amplification, frequency down conversion. filtering, channel selection, and like, and in example shown in FIG. 3, analog-to-digital (A/D) conversion. A/D conversion of a received signal allows more complex communication functions such as demodulation and decoding to be performed in DSP 46. In a similar manner, signals to be transmitted are processed, including modulation and encoding, for example, by DSP 46. These DSP-processed signals are input to transmitter 40 for digital-to-analog (D/A) conversion, frequency up conversion, filtering, amplification and transmission over communication network via antenna 44. DSP 46 not only processes communication signals, but also provides for receiver and transmitter control. For example, the gains applied to communication signals in receiver 36 and transmitter 40 may be adaptively controlled through automatic gain control algorithms implemented in DSP 46.

Network access is associated with a subscriber or user of mobile station 32. In one embodiment, mobile station 32 uses a Subscriber Identity Module or "SIM" card 74 to be inserted in a SIM interface 76 in order to operate in the network. SIM 74 is one type of a conventional "smart card" used to identify an end user (or subscriber) of the mobile station 32 and to personalize the device, among other things. Without SIM 74, the mobile station terminal in such an embodiment is not fully operational for communication through a wireless network. By inserting SIM 74 into mobile station 32, an end user can have access to any and all of his/her subscribed services. SIM 74 generally includes a processor and memory for storing information. Since SIM 74 is coupled to a SIM interface 76, it is coupled to microprocessor 64 through communication lines. In order to identify the subscriber, SIM 74 contains some user parameters such as an International Mobile Subscriber Identity (IMSI). An advantage of using SIM 74 is that end users are not necessarily bound by any single physical mobile station. SIM 74 may store additional user information for the mobile station as well, including datebook (or calendar) information and recent call information. It will be appreciated that mobile station 32 may also be used with any other type of network compatible mobile device 10 such as those being code division multiple access (CDMA) enabled and should not be limited to those using and/or having a SIM card 74.

Mobile station 32 is a battery-powered device so it also includes a battery interface 70 for receiving one or more rechargeable batteries 72. Such a battery 72 provides electrical power to most if not all electrical circuitry in mobile station 32, and battery interface 70 provides for a mechanical and electrical connection for it. The battery interface 70 is coupled to a regulator (not shown) which provides a regulated voltage V to all of the circuitry.

Mobile station 32 in this embodiment includes a microprocessor 64 which controls overall operation of mobile station 32. It will be appreciated that the microprocessor 64 may be implemented by any processing device. Communication functions, including at least data and voice communications are performed through communication subsystem 34. Microprocessor 64 also interacts with additional device subsystems which may interface with physical components of the mobile device 10. Such addition device subsystems comprise a display 48, a flash memory 50, a random access memory (RAM) 52, auxiliary input/output subsystems 54, a serial port 56, a keyboard 58, a speaker 60, a microphone 62, a short-range communications subsystem 66, and any other device subsystems generally designated at 68. Some of the subsystems shown in FIG. 3 perform communication-related functions, whereas other subsystems may provide "resident" or on-device functions. Notably, some subsystems such as keyboard 58 and display 48, for example, may be used for both communication-related functions, such as entering a text message for transmission over a communication network, and device-resident functions such as a calculator or task list. Operating system software used by microprocessor 64 is preferably stored in a persistent store such as flash memory 50, which may alternatively be a read-only memory (ROM) or similar storage element (not shown). Those skilled in the art will appreciate that the operating system, specific device applications, or parts thereof, may be temporarily loaded into a volatile store such as RAM 52.

Microprocessor 64, in addition to its operating system functions, preferably enables execution of software applications on mobile station 32. A predetermined set of applications which control basic device operations, including at least data and voice communication applications, as well as the inventive functionality of the present disclosure, will normally be installed on mobile station 32 during its manufacture. A preferred application that may be loaded onto mobile station 32 may be a personal information manager (PIM) application having the ability to organize and manage data items relating to user such as, but not limited to, e-mail, calendar events, voice mails, appointments, and task items. Naturally, one or more memory stores are available on mobile station 32 and SIM 74 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 32 with respect to such items. This is especially advantageous where the host computer system is the mobile station user's office computer system. Additional applications may also be loaded onto mobile station 32 through network, an auxiliary subsystem 54, serial port 56, short-range communications subsystem 66, or any other suitable subsystem 68, and installed by a user in RAM 52 or preferably a non-volatile store (not shown) for execution by microprocessor 64. Such flexibility in application installation increases the functionality of mobile station 32 and may provide enhanced on-device functions, communication-related functions, or both. For example, secure communication applications may enable electronic commerce functions and other such financial transactions to be performed using mobile station 32.

In a data communication mode, a received signal such as a text message, an e-mail message, or web page download will be processed by communication subsystem 34 and input to microprocessor 64. Microprocessor 64 will preferably further process the signal for output to display 48 or alternatively to auxiliary I/O device 54. A user of mobile station 32 may also compose data items, such as e-mail messages, for example, using keyboard 58 in conjunction with display 48 and possibly auxiliary I/O device 54. Keyboard 58 is preferably a complete alphanumeric keyboard and/or telephone-type keypad. These composed items may be transmitted over a communication network through communication subsystem 34.

For voice communications, the overall operation of mobile station 32 is substantially similar, except that the received signals would be output to speaker 60 and signals for transmission would be generated by microphone 62. Alternative voice or audio I/O subsystems, such as a voice message recording subsystem, may also be implemented on mobile station 32. Although voice or audio signal output is preferably accomplished primarily through speaker 60, display 48 may also be used to provide an indication of the identity of a calling party, duration of a voice call, or other voice call related information, as some examples.

Serial port 56 in FIG. 3 is normally implemented in a personal digital assistant (PDA)-type communication device for which synchronization with a user's desktop computer is a desirable, albeit optional, component. Serial port 56 enables a user to set preferences through an external device or software application and extends the capabilities of mobile station 32 by providing for information or software downloads to mobile station 32 other than through a wireless communication network. The alternate download path may, for example, be used to load an encryption key onto mobile station 32 through a direct and thus reliable and trusted connection to thereby provide secure device communication.

Short-range communications subsystem 66 of FIG. 3 is an additional optional component which provides for communication between mobile station 32 and different systems or devices, which need not necessarily be similar devices. For example, subsystem 66 may include an infrared device and associated circuits and components, or a Bluetooth™ communication module to provide for communication with similarly enabled systems and devices. Bluetooth™ is a registered trademark of Bluetooth SIG, Inc.

Figure 4:
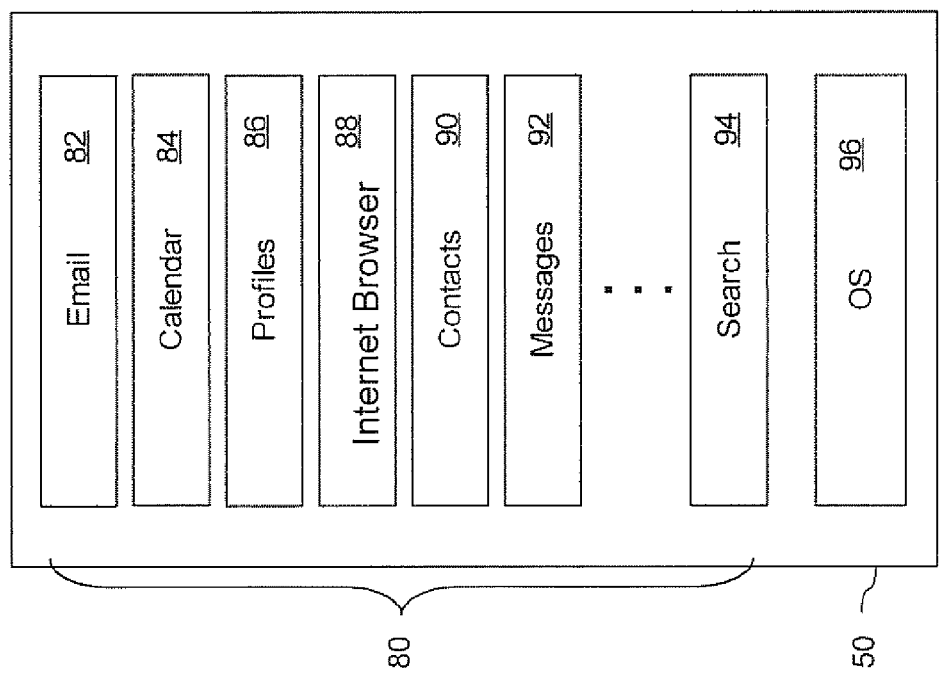
FIG. 4 is a schematic block diagram of the memory shown in FIG. 3.

As shown in FIG. 4, memory 50 includes a plurality of applications 80 associated with a series of icons 102 (see FIG. 5) for the processing of data. Applications 80 may be any variety of forms such as, without limitation, software, firmware, and the like. Applications 80 may include, for example, electronic mail (e-mail) 82, calendar program 84, storage and/or program for contacts 86, an Internet browser 88, contacts application 90, storage for messages 92, a search function and/or application 94 etc. An operating system (OS) 96 also resides in memory 50. The mobile devices 10 of the present disclosure are also configured to enable communication between different ones of the applications, e.g. between contacts application 90 and the email application 82. Also, the icons 102 for the applications on the mobile devices 10 can be modified, named, moved, sorted and otherwise interacted with for the purposes of organizing and/or manipulating the visibility of the icons for those applications 102.

Figure 5:
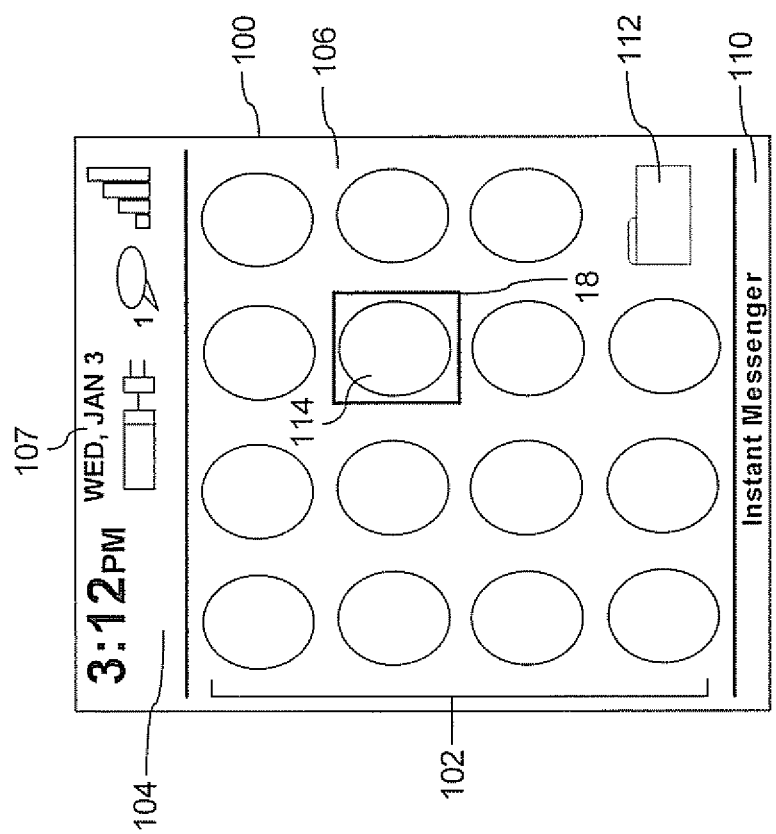
FIG. 5 is a screen shot of a home screen for the mobile device of any or both of FIGS. 1 and 2.

Turning now to FIG. 5, the mobile device 10 displays a home screen 100, which is preferably the active screen when the mobile device 10 is powered up and constitutes the main ribbon application. The home screen 100 generally comprises a status region 104 and a theme background 106, which provides a graphical background for the display 12. The theme background 106 displays a series of icons 102 in a predefined arrangement on a graphical background.

In some themes, the home screen 100 may limit the number icons 102 shown on the home screen 100 so as to not detract from the theme background 106, particularly where the background 106 is chosen for aesthetic reasons. The theme background 106 shown in FIG. 5 provides a grid of icons. In other themes (not shown), a limited list of icons may be displayed in a column (or row) on the home screen along one portion of the display 12. In yet another theme, the entire list of icons may be listed in a continuous row along one side of the home screen on the display 12 enabling the user to scroll through the list while maintaining a limited number of currently visible icons on the display 12. In yet another theme (not shown), metadata may be displayed with each of a limited number of icons shown on the home screen. For example, the next two appointments in the user's calendar may be accessed by the processor 64 and displayed next to the calendar icon. It will be appreciated that preferably several themes are available for the user to select and that any applicable arrangement may be used.

One or more of the series of icons 102 is typically a folder 112 that itself is capable of organizing any number of applications therewithin.

The status region 104 in this embodiment comprises a date/time display 107. The theme background 106, in addition to a graphical background and the series of icons 102, also comprises a status bar 110. The status bar 110 provides information to the user based on the location of the selection cursor 18, e.g. by displaying a name for the icon 102 that is currently highlighted.

Accordingly, an application, such as the email application 82 may be initiated (opened or viewed) from display 12 by highlighting an email icon 114 using the positioning device 14 and providing a suitable user input to the mobile device 10. For example, email application 82 may be initiated by moving the positioning device 14 such that the contacts icon 114 is highlighted as shown in FIG. 5, and providing a selection input, e.g. by pressing the trackball 14b.

Figure 6:
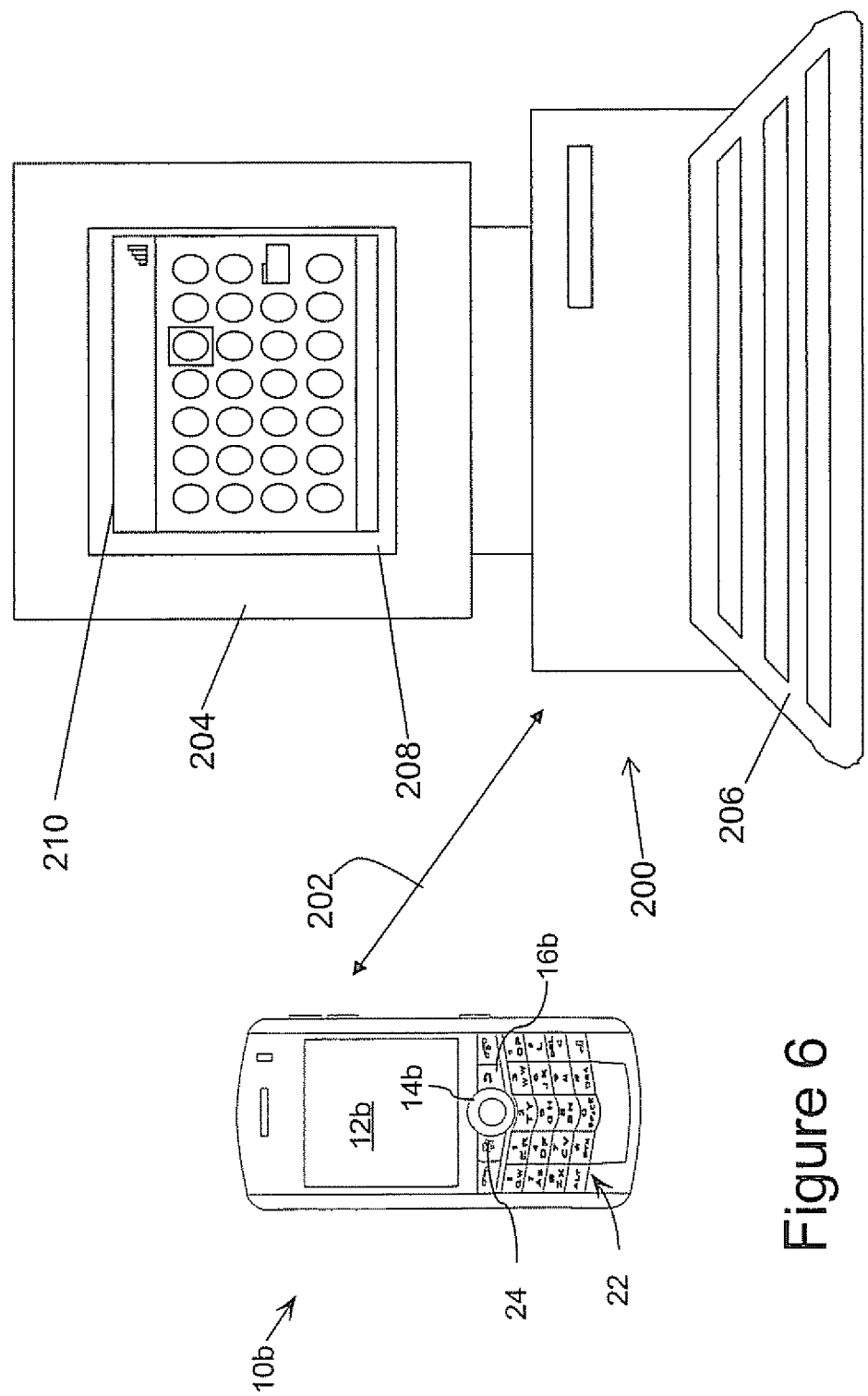
FIG. 6 is a schematic diagram showing a mobile device-personal computer (PC) interface.

Turning now to FIG. 6, the mobile device 10b and an external computing device 200 are shown, with a communication connection 202 therebetween. The connection 202 can be wired or wireless, and may include, for example, universal serial bus (USB) cable, Bluetooth®, infrared, or any other suitable connection. The external computing device 200, in this example, includes a display monitor 204 and a keyboard 206. The display monitor 204 includes a display screen 208, which, as can be seen in FIG. 6, is capable of displaying a current copy or 'mirrored' version of what is being displayed by the mobile device 10b. In this example, the home screen 100 shown in FIG. 5 can be seen on the display screen 208 in an application window 210. The configurations described below also enable a user to take advantage of the wireless communication capabilities of mobile device 10 while at the same time harnessing the input/output facilities of the external computing device 200. It will be appreciated that although shown as a PC in FIG. 6, the external computing device 200 can be any computing device that is external to the mobile device 10. For example, the external computing device 200 may instead be a laptop computer or any other computing terminal that includes a display and input mechanism such as a keyboard or keypad. Similarly, the principles discussed below can be equally applied to other devices that are not necessarily mobile devices 10.

In order to enable the external computing device 200 to utilize the applications residing on the mobile device 10 and to be able to display a corresponding user interface (UI) etc., the external computing device 200 needs to either have its own version of the UI or include a simulator that can obtain or receive data from the mobile device 10 and mimic the data on its own screen. This can require significant programming and the installation of additional programs or modules in order to achieve this result.

Figure 7:
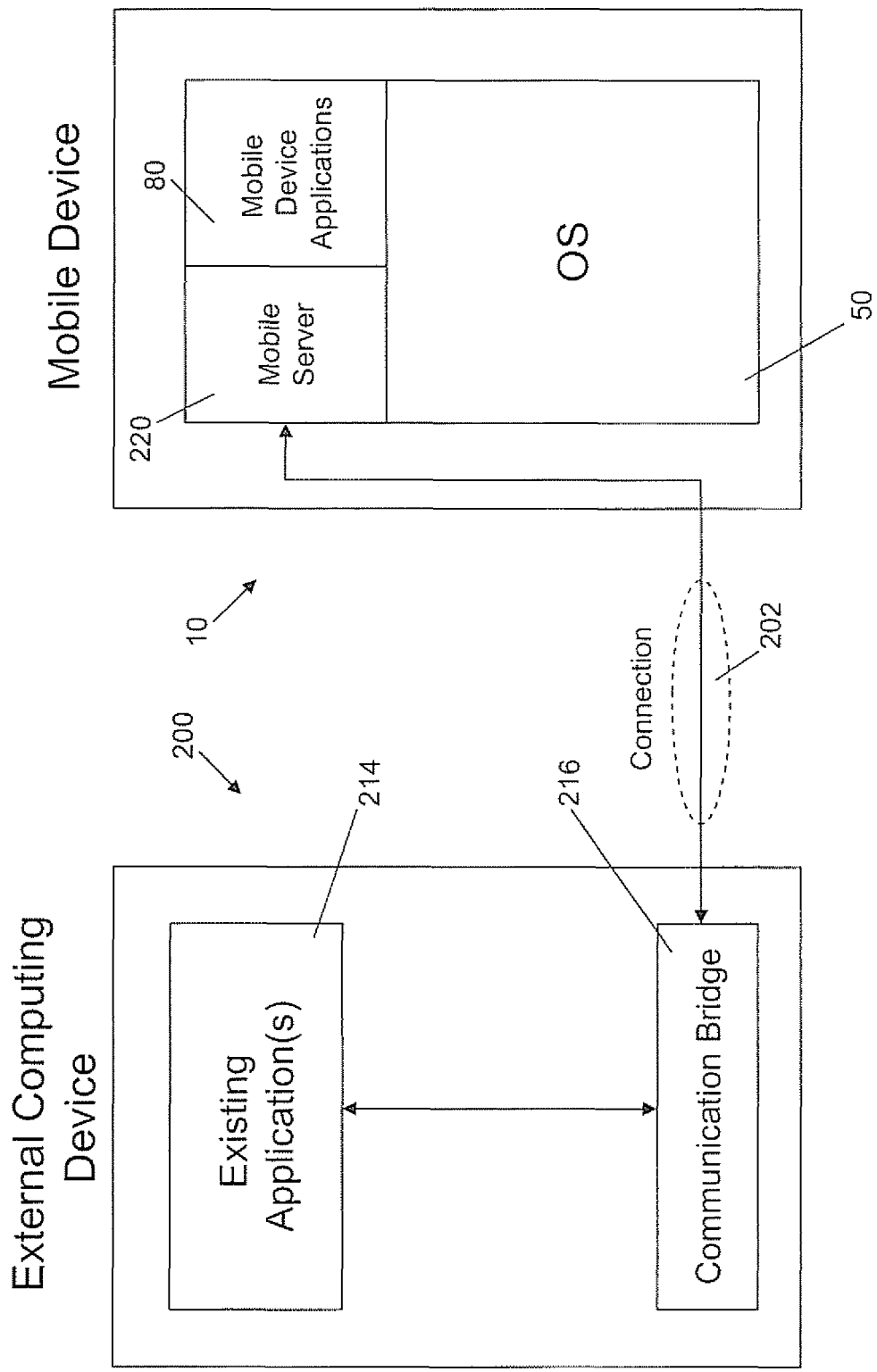
FIG. 7 is a schematic diagram of one embodiment for interfacing between a mobile device and an external computing device.

It has been found that the mobile device 10 can instead include a mobile server 220 that simulates or mimics an existing entity, server or host that is known to the external computing device 200 so that the external computing device 200 can utilize the UI and familiarity of its existing applications 214. This is shown generally in FIG. 7. In FIG. 7 it can be seen that the mobile device 10 includes the mobile server 220 which acts as an intermediary between the mobile device applications 80 and mobile device operating system (OS) 50 and the existing applications 214 on the external computing device 200. This allows the user to access data and change settings in the mobile device 10 through an existing program, software or computer readable medium (either unaltered or containing custom computer readable instructions) running on the external computing device 200 through the communication link 202. Because the mobile server 220 connects to the existing applications 214 through a communication bridge 216 that would otherwise be capable of communicating with the actual server or host (e.g. external mail server), the external computing device 200 believes that it is communicating with and accessing data from the actual server that is being simulated.

The communication bridge 216 can be any software or hardware module that facilitates the connectivity of the external computing device 200 with the outside world. This may require that the bridge 216 translate between a protocol known and used by the existing application and that used by the communication connection 202. An examples includes a TCP/IP-to-USB bridge that allows a TCP/IP connection for a web browser through a USB cable that is connected to the mobile device 10. As will be discussed below, the mobile server 220 is configured to access data from and provide data to the applications 80 on the mobile device 10 and display the user interactions and suitable UI to the user on the external computing device 200. The mobile server 220 and any applicable software or computer readable medium or module that is needed to operate the particular embodiment of the mobile server 220, would thus need to be installed on the mobile device 10 in order to access the applications 80 through the existing applications 214 on the external computing device 200.

As will be discussed below, there are several server types that can be used for different applications 80 and combinations of configurations or 'hybrid' solutions can be used to handle applications 80 with different priorities, i.e. "core" vs. "non-core". By mimicking an existing server, the amount of programming required is reduced, the likelihood of the external computing device 200 and mobile device 10 being out-of sync is reduced or eliminated, and the familiarity of the external computing, device 200 retained to enhance the user experience. So long as the mobile server 220 is able to extract data from the applications in a format known to the corresponding existing application 214, the user can utilize the mobile device applications 80 from the external computing device 200.

In general, the configuration for interfacing between the mobile device 10 and the external computing device 200 should be chosen to best suit the application requirements and the particular environment. It can be seen that by interfacing with the external computing device 200 in one or more of the ways exemplified below, operations typically performed on the mobile device 10 can be hosted by the external computing device 200 to increase efficiencies in mobile communications. Also, the mobile device's connectivity for effecting data communications can be used in conjunction with the convenient features of the external computing device 200 without requiring that the external computing device 200 have the same connectivity. In other words, the user can take advantage of the wireless communication capabilities of the mobile device 10 while using the external device's input/output facilities. In this way, the mobile device 10 offers additional functionality to the external computing device 200 and vice versa. As such, if the external computing device 200 has no Internet connectivity, the mobile device 10 can provide connectivity to the user trough the chosen interface configuration.

Given the typical uses of the mobile devices 10, there are certain applications 80 that have additional considerations. Firstly, the email application 82. The email application 82 is often the most used application 80 on the mobile device 10 and, as discussed above, can require a significant amount of user interaction. As such, enhancing the email experience for the user should be of primary concern when utilizing the features offered by the external computing device 200. Secondly, users may wish to use their standard browser that is hosted by their mobile device 10. If a browser enabler at a dedicated server of the service provided is available, text and image compression such as SlipStream™ acceleration can be utilized with decompression occurring on either the external computing device 200 or the mobile device 10. Thirdly, users may wish to be able to use the native mobile device application 80 for viewing attachments and this should be accommodated. Fourthly, as more users become reliant on $3^{rd}$ party applications loaded on and used with the mobile device 10, such applications 80 should also be supported to increase usability. This can be done by updating the mobile server 220 on a regular basis, either according to what is currently stored on the mobile device 10 or what is available to the mobile device 10.

Several embodiments for providing an external user interface for the mobile device 10 are described below. In the examples described below, the external computing device 200 uses a connection to the mobile device 10 via either USB or Bluetooth®. The communication prerequisites that enable normal communications with the external computing device 200, such as to synchronize email and contacts, will be needed (e.g. a device manager 228 installed on the external computing device 200). This is typically required for USB configurations. For Bluetooth® implementations, a Bluetooth® application such as the Microsoft® Bluetooth® stack as well as an interface layer should be installed. It may be noted that when selecting a particular configuration, e.g. choosing between USB and Bluetooth®, bandwidth usage and bandwidth limitations should be considered. For example, a Bluetooth® connection 202 may not have enough bandwidth to support every configuration in as efficient manner as another configuration, e.g. when compared to using a USB connection 202.

Figure 8:
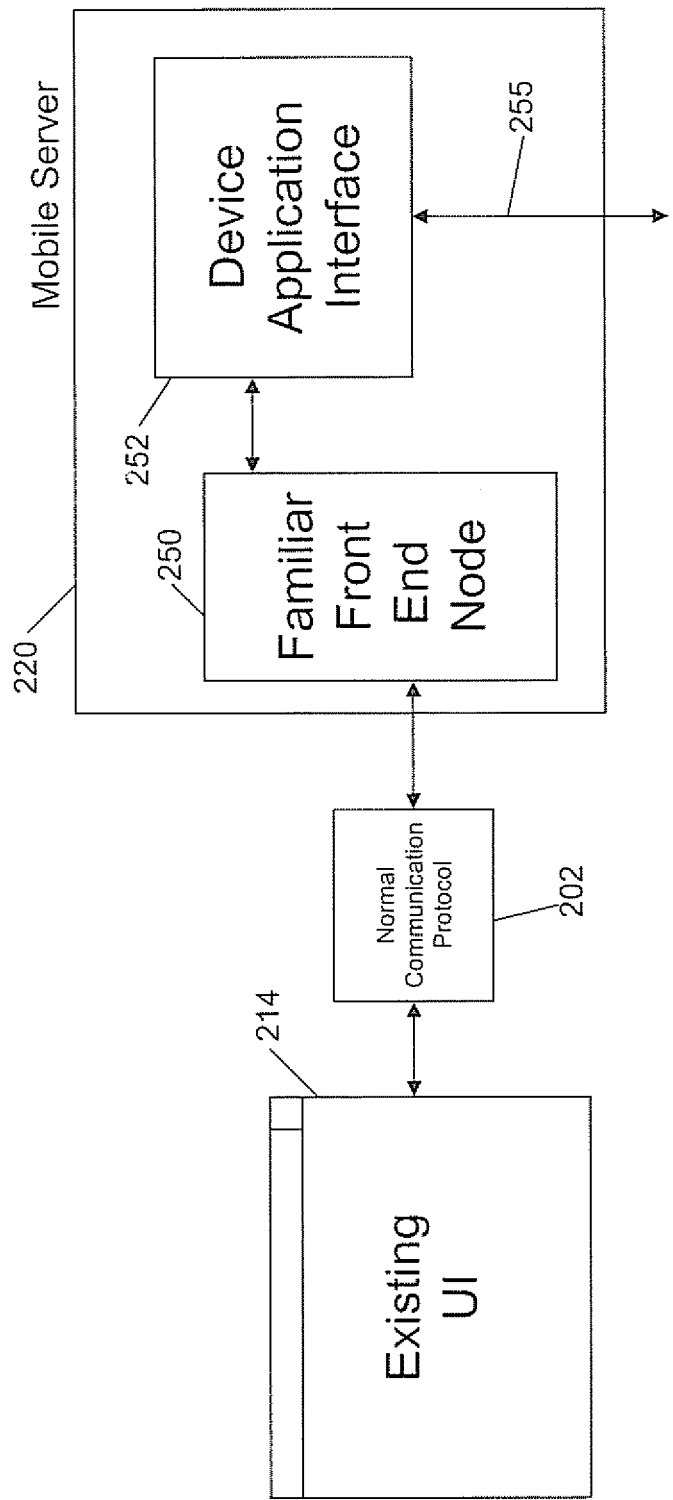
FIG. 8 is a schematic diagram illustrating further detail of the mobile server shown in FIG. 7.

Referring now to FIG. 8, further detail of the configuration shown in FIG. 7 is provided. It can be seen that the mobile server 220 comprises software code, modules, objects etc. that can simulate a familiar front end node 250 that is capable of participating in a normal or known communication protocol over the connection 202 with an existing UI 214 that is familiar with or can be configured to participate in the communication protocol. As noted above, this may require a communication bridge 216 (e.g. a device manager 228) to be installed on the external computing device 200. Typically, external computing devices 200 that are operated by the same user as the mobile device 10 will already include a device manager 228, e.g. for synchronizing the devices 200, 10 and thus minimal set-up can be achieved. The front end node 250 has access to and communicates with a device application interface 252 which in general, executes the processing steps required to put the data stored on the mobile device 10 into a form that can be used by the existing UI 214 at the other end. The device application interface 252 also access data stored in or otherwise found in the mobile device 10, either in applications or in memory or other data store that maintains up to date data and information for an application 80 such as the storage of email messages, contact information etc. Such data in the mobile device 10 is obtained via a connection 255 to the appropriate hardware or software or both in the mobile device 10.

In operation, when the existing program 214 initiates a session using the normal communication protocol, the front end node 250 simulates the address or any other identifier which allows the existing application 214 to communicate with the front end node 250 so that the session can be established. The front end node 250 then accesses the device application interface 252 to obtain the proper data and information for the specific application 214 being used on the external computing device 200. The device application interface 252, as needed, may then obtain the data by accessing the appropriate location on the mobile device 10 via connection 255. The device application interface then performs any required processing such as data-format conversion so that the data is in a usable form to be used by or displayed in the existing application 214.

Figure 9:
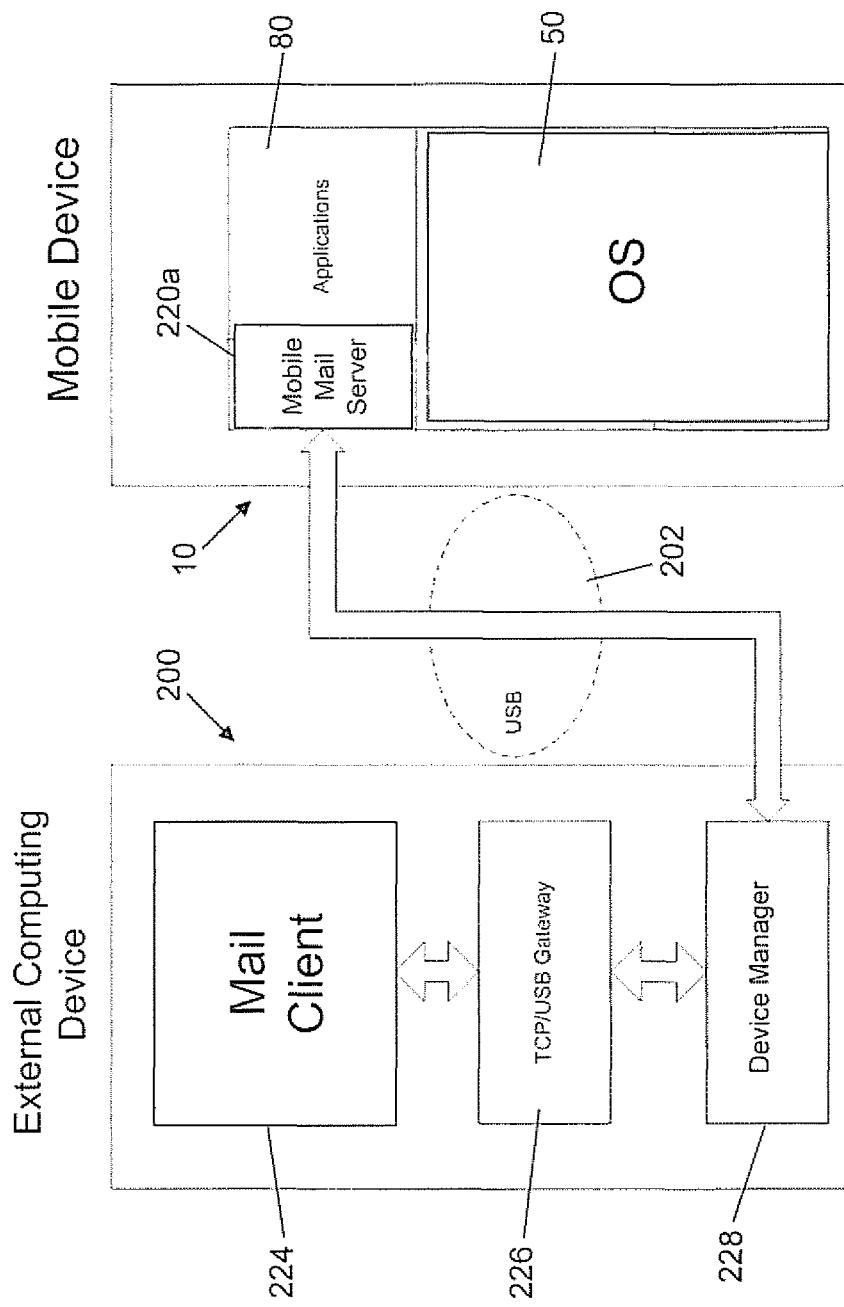
FIG. 9 is a schematic diagram illustrating an mail server version of the embodiment shown in FIG. 7.

Referring now to FIG. 9, an email focussed configuration of the mobile server 220 is shown which involves simulating an email experience by way of a mobile email server 220a where the suffix "a" denotes similar elements with respect to FIG. 7 that are configured for such an email focussed configuration. It can be seen in FIG. 9 that the existing application 214 in this embodiment is a email client 224 that would already be installed and in use on the external computing device 200 (e.g. email program such as Outlook®). A TCP/USB gateway 226 is provided to translate a TCP/IP request from the email client 224 to a USB compatible message that is sent over the USB connection 202 through the device manager 228. It will be appreciated that the device manager 228 may contain the TCP/USB gateway so that when a user opens the email client 224, the device manager 228 can detect this event and redirect the request over the connection 202 to the mobile email server 220a. It may be noted that some configuration steps are needed on the external computing device 200. For example, in an email configuration as shown in FIG. 9, where Outlook® and an IMAP server 220 are being used, an additional profile would need to be set up in Outlook® to enable Outlook® to talk to the TCP port on the communication bridge 216, instead of the normal server.

One example of the mobile email mobile 220a involves implementing an IMAP mail server application 250a which would act as a relay between the user's mobile device 10 and any IMAP client, e.g. Microsoft Outlook®. In this configuration, any standard desktop mail application could be used, and the TCP/USB gateway 226 could also be used to support native web browsing. This approach is particularly suitable for supporting email. Some considerations to this approach include where emails have a significant amount of data that is provided to the user in portions. An automatic dispersal of "more" data would likely need to be implemented prior to sending the email messages to the existing email client 224 application. The mobile email server 220a is responsible for being the intermediary between the email client 224 that is requesting information to be used by its UI and the actual data that is stored on the mobile device 10, e.g. by accessing a particular application 80, data store, data buffer etc.

Figure 10:
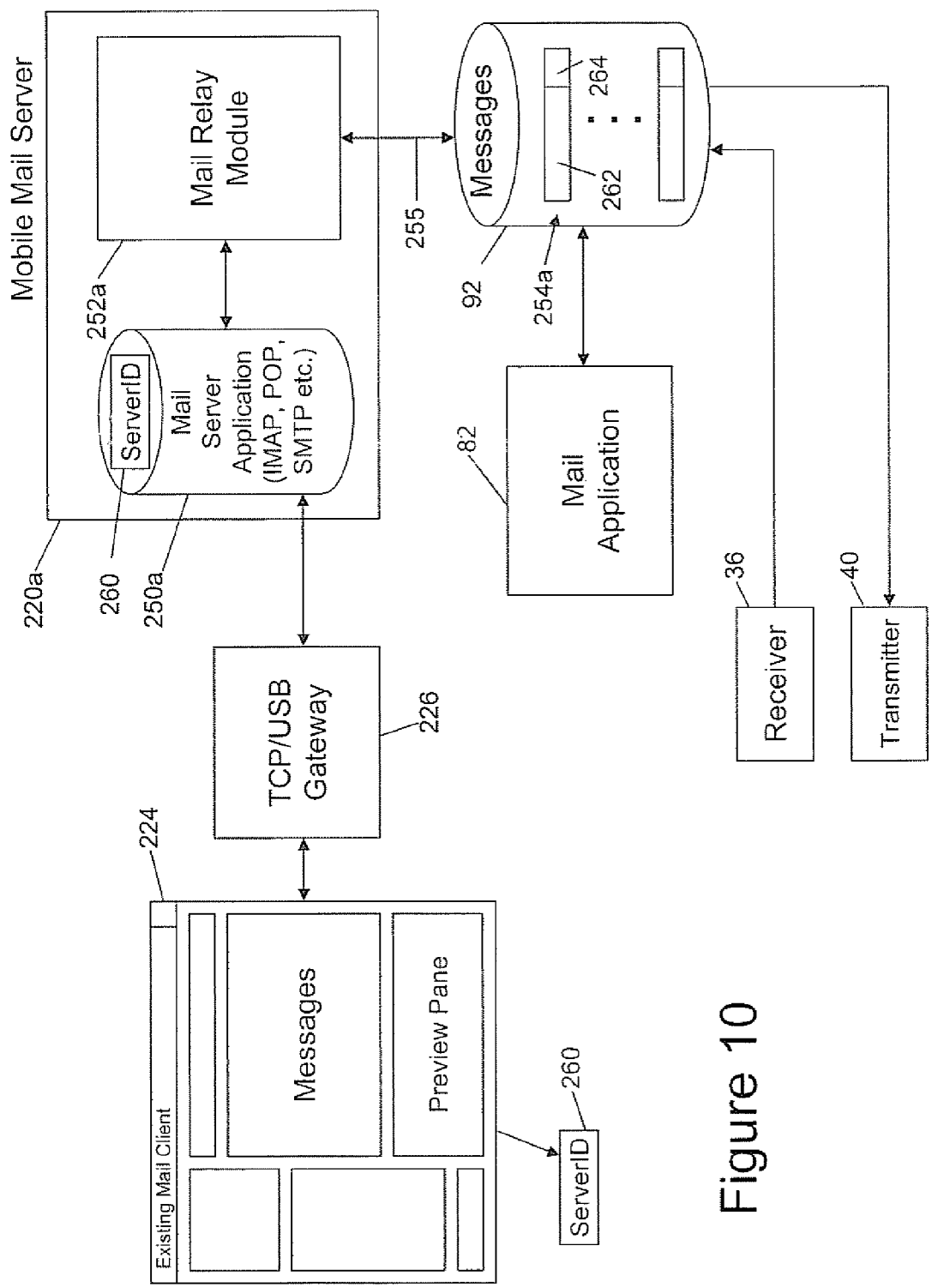
FIG. 10 is a schematic diagram illustrating further detail of the mail server shown in FIG. 9.

FIG. 10 illustrates further detail of the mobile email server 220a. In this embodiment, a mail server application 250a is used as the front end node 250, which can be configured for IMAP, POP, SMTP etc. The email server application 250a stores a copy of a serverID 260, which is any information such as an address that would be used by the email client 224 to signify in the request as to with which mail server it should be communicating. The serverID 260 is therefore accessible to the email client 224 and would typically represent an actual address of an actual email server. The actual email server (not shown) should be the same email server that the mobile device 10 uses to access email messages when synchronizing the mobile device 10 during normal use since the email client 224 is expecting to view the mail messages that would otherwise be available on the mobile device 10.

The email client 224 communicates with the email server application 250a over a TCP/USB gateway 226. The email server 250a then utilizes an email relay module 252a that is programmed into the mobile email server 220a to retrieve messages 92 and other information that is normally used by the email application 92 on the mobile device 10. It can be seen that the message store 92 includes a series of email messages 254a that comprise a message body and header 262 (i.e. content and configuration of email) and flags 264 that indicate the status of the email message 254a, e.g. opened, replied to, etc. The mobile device 10 normally receives the messages 254a (and other data) through the receiver 36 and sends new email messages (or replies) via the transmitter 40. Since the mobile device 10 is continually synchronizing its email application 82 with data that is maintained by the actual email server, the email relay module 252a can update the email server application 250a in the same way the actual email server is updated and is normally synchronized with the mobile device 10. In the example shown in FIG. 10, the email relay module 252a can simply copy the current messages populating the message store 92 when the connection with the existing email client 224 is initiated, i.e. to populate the email client 224 as if it was accessing the actual email server and then, periodically or according to an external or internal trigger (e.g. whenever new email is received or sent), run a delta routine to refresh the email client 224 in the same way the email client 224 would operate on the external computing device 200 when not connected to the mobile device 10. In this way, the email client 224 on the external computing device 200 will appear to be operating as if the email server application 250a is the actual email server.

Figure 11:
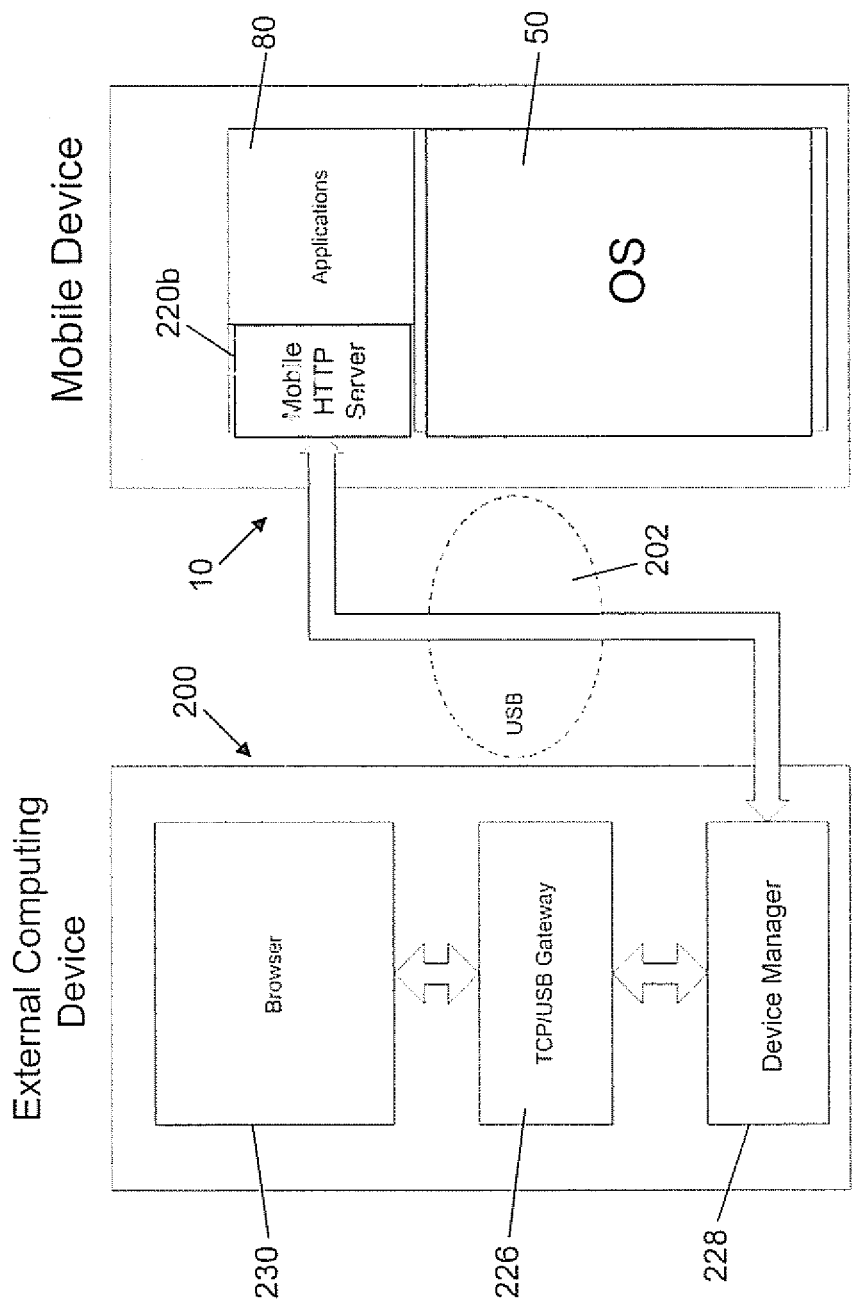
FIG. 11 is a schematic diagram illustrating a hypertext transfer protocol (HTTP) server version of the embodiment shown in FIG. 7.

Referring now to FIG. 11, a web browser focussed configuration of the mobile server 220 is shown which involves simulating a web browser experience by way of a mobile HTTP server 220b where the suffix "b" denotes similar elements with respect to FIG. 7 that are configured for such a web browser focussed configuration. It can be seen in FIG. 11 that the existing application 214 in this embodiment is a web browser 230 that would already be installed and in use on the external computing device 200.

Figure 12:
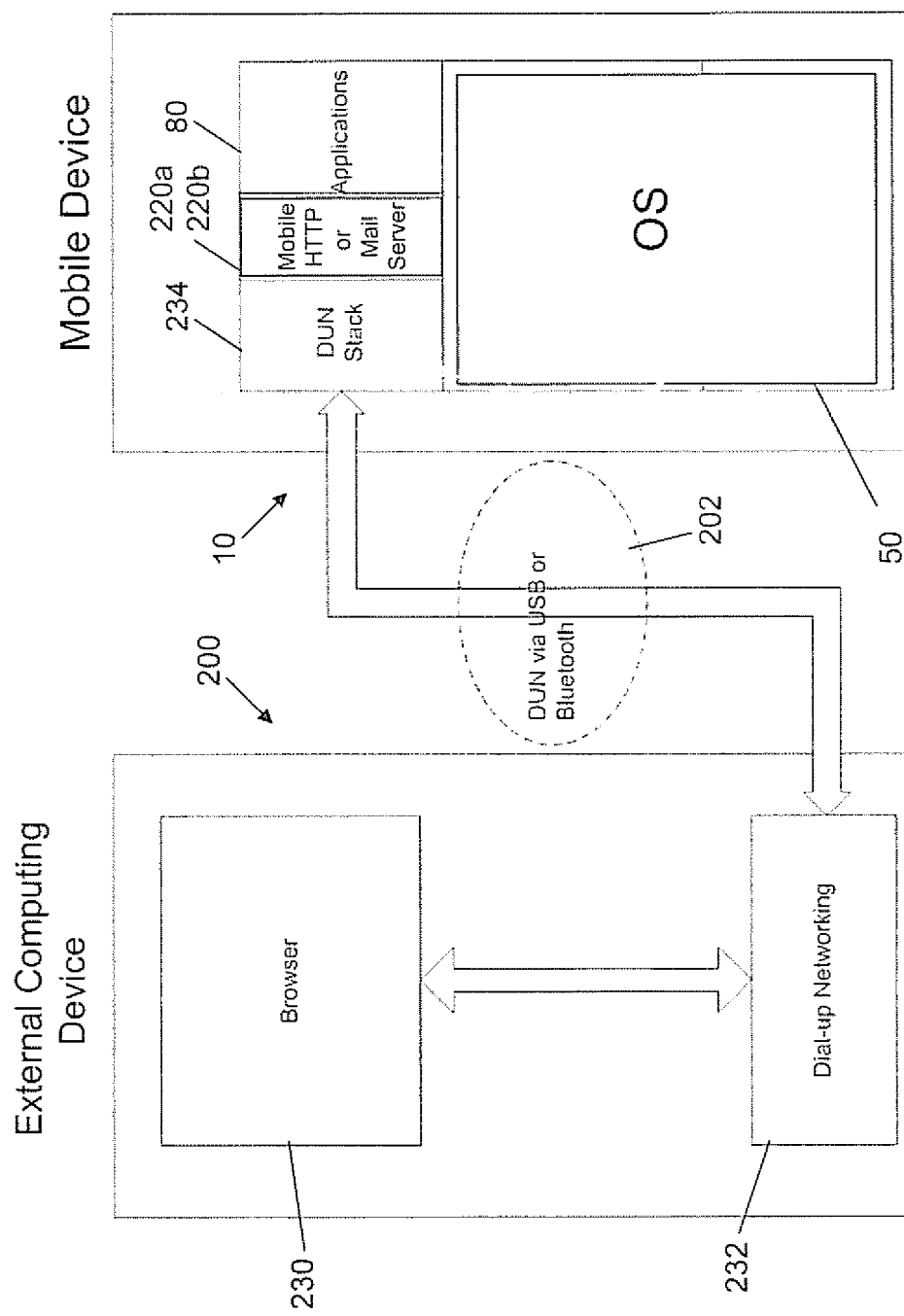
FIG. 12 is a schematic diagram illustrating further detail of the mail server shown in FIG. 11.

It can be seen that the browser 230 communicates with and initiates a session with the mobile HTTP server 220b through the TCP/USB gateway 226 and device manager 228 in a manner similar to the mobile email server embodiment described above. In the HTML-UI approach, the application UI that is accessed by the browser 230 as if it was accessing a web page, would typically be implemented using HTML and JavaScript™ and rendered by the browser 230 on the external computing device 200. This configuration would generally be easier to port to other platforms than simulating everything that is on the mobile device 10 as has been done in previous solutions. It may be noted that little or no additional client software would be required if using a dial-up-network (DUN) via Bluetooth (see FIG. 12 discussed below). The TCP/USB gateway 226 shown in FIG. 11 could also be used to support native web browsing and thus enable the external computing device 200 to utilize the wireless communications capabilities of the mobile device 10. In this embodiment it may be noted that the UI can be affected by the restrictions of HTML/JavaScript™. FIG. 11 shows a first HTML option, which uses the device manager 228 and a USB connection 202, and FIG. 12 shows a second HTML option, which uses a DUN stack 234. It may be noted that some configuration steps may be needed on the external computing device 200. For example, in a browser configuration shown in FIG. 11, where Internet Explorer® and a mobile HTTP server 220 are being used, the system would need to be configured to point the IE® browser at the TCP port on the communication bridge 216 (e.g. a URL such as http://localhost:9000).

Figure 13:
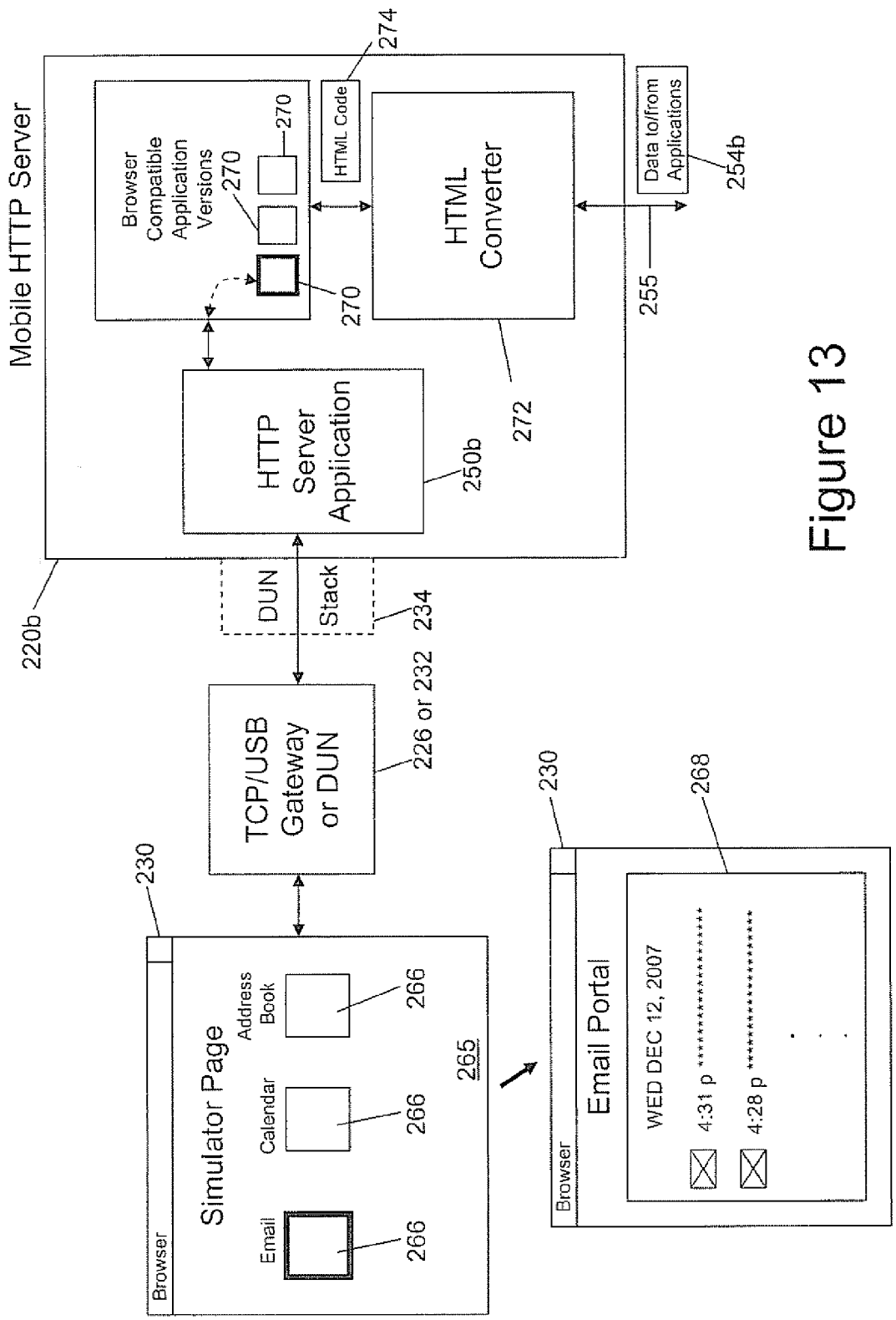
FIG. 13 is a schematic diagram illustrating a mobile server version of the embodiments shown in FIG. 9 or FIG. 11 utilizing dial up networking (DUN).

Turning now to FIG. 13, further detail of the configurations shown in FIGS. 11 and 12 is provided. The browser 230 is used to simulate mobile device applications 80 on the external computing device 200. The user can simply open the browser 230 on the external computing device 200 and enter an address that, when requested through the DUN 232 or TCP/USB gateway 226, directs the browser 230 to a simulator page 265 that is hosted by the HTTP server application 250b on the mobile device 10. The simulator page 265 includes a UI to enable the user to initiate a mobile device application 80 using a series of links 266 (e.g. through hyperlinking or selectable icons). The links 266 can be selected and initiated in any known way such as by double or single clicking the link 266.

In the example shown in FIG. 13, the user has selected the link 266 associated with an email portal 268, which is also shown in FIG. 13. The email portal 268 is provided by a browser compatible application version 270 of the email program 82 on the mobile device 10. This is done as if the browser 230 was accessing a web-based email program. The mobile HTTP server 220b utilizes an HTML converter 272 that obtains data 254b from the applications associated with the compatible application version 270 over the connection 255 to the appropriate location in the mobile device 10 and converts this data to the HTML code 274 that is rendered by the browser 230 into the email portal 268. This configuration allows the user to simply access a particular address trough their browser 230 that directs them to a simulator page 265 hosted by the HTTP server application 250b. The HTTP server application 250b is responsible for obtaining HTML data 274 to populate the specific portal 268 being used.

Although the mobile device 10 requires the installation and configuration of the mobile HTTP server 220b, this configuration requires little if any programming or installation on the external computing device side particularly if the device manage 228 is already being used). In this way, only the mobile device 10 needs to be updated to accommodate new programs (e.g. third party applications) and the browser 230 simply has access to whatever is being 'offered' by the HTTP server application 250b. Again, this may require pointing the browser 230 to the TCP port on the communication bridge 126. This avoids any lag introduced when a new application is supported by the mobile device 10 but the external computing device 200 has not yet received its own update (i.e. in previous solutions). Only the mobile device 10 would need to be updated, which can be done using its wireless communication capabilities, e.g. through a subscription service, updates pushed to the mobile device 10, etc.

It can be seen from the embodiments described above that there are several configurations that can be used to provide the best solution to satisfy the specific requirements of the application. There is thus no one solution that is preferred overall. However, a hybrid solution involving an HTML UI for "core" applications (e.g. email) and a display mirror for all other applications that are used less frequently, is another preferable solution for most typical applications. This embodiment is shown in FIG. 14.

Figure 14:
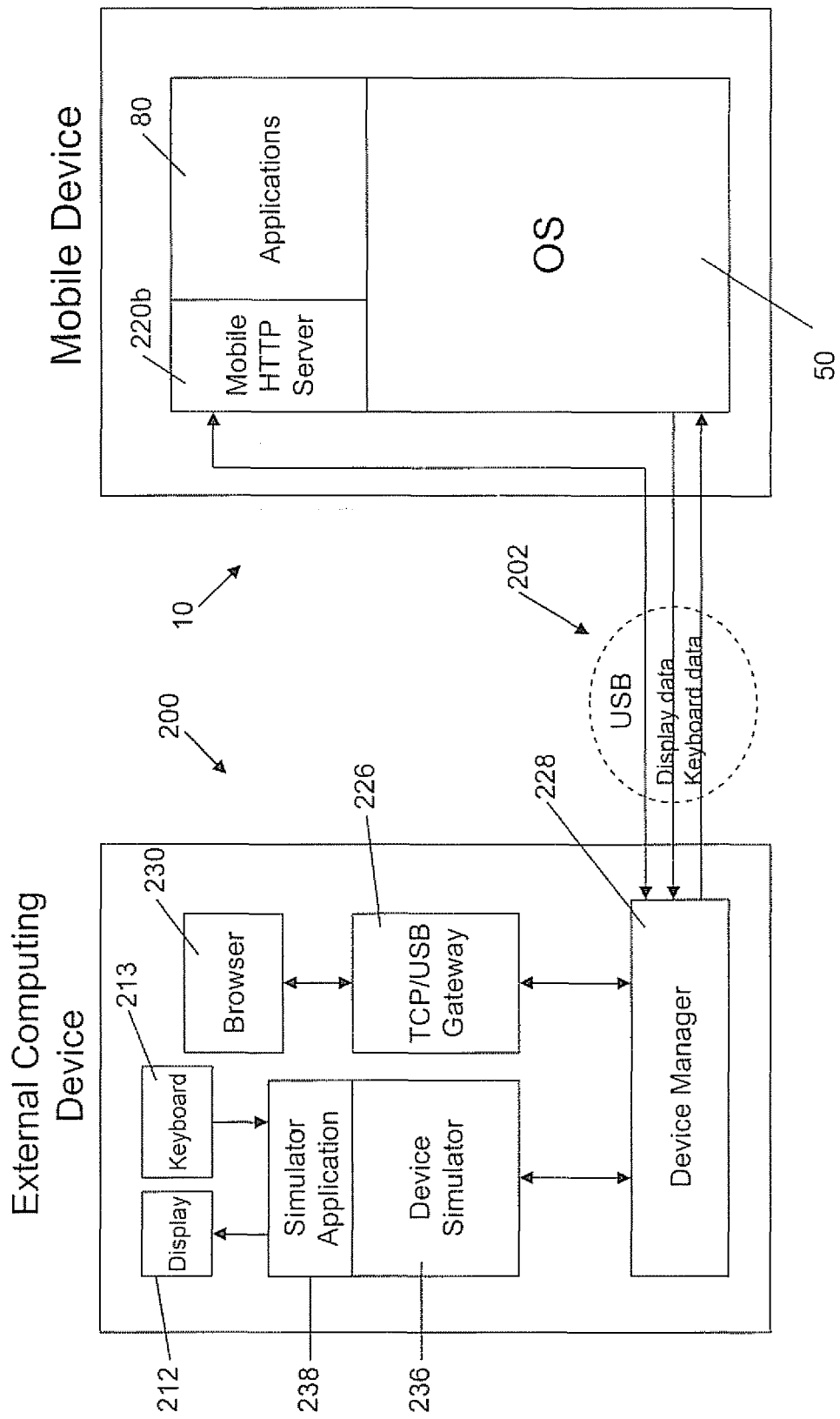
FIG. 14 is a schematic diagram of another embodiment for interfacing between a mobile device and an external computing device which utilizes a hybrid of the embodiment of FIG. 11 and a device simulator.

The display mirror can be implemented in many different ways, one of which is shown in FIG. 14 wherein a simulator application 64 and a device simulator 236 are installed on the external computing device 200. The hybrid solution shown in FIG. 14 is most suitable where the user typically uses the same external computing device 200 (e.g. an office PC) to connect to their mobile device 10.

The device simulator 64 is a component that runs in the operating environment of the external computing device 200 (e.g. Windows®) and is used to mimic or copy what is running on the mobile device 10. By using the device simulator 64, the UI seen on the external computing device 200 is substantially identical to that seen on the mobile device 10 and thus the user would be familiar with the "mirrored" interface. This is exemplified in FIG. 6 where the home screen 100 of the mobile device 10 is seen on the display screen 208 of the external computing device 200. Although this UI is familiar to the user, if a traditional "desktop look and feel" is desired, then a different configuration may be needed since the exact UI feel of the mobile device 10 is provided to the external computing device 200 using this type of configuration. Also, the bandwidth capabilities of the connection 202 should be considered as mirroring the UI can have relatively higher bandwidth requirements.

FIG. 14 shows one way to implement the mirrored configuration using the device simulator. In the configuration shown in FIG. 14, the display is mirrored. This approach utilizes the simulator application 64 running with the device simulator 236, which acts as a proxy for the mobile device display 12 and keyboard 22. As the display 12 is updated, the mobile device 10 sends its screen/display buffer data over the connection 202 (USB in this example) to the simulator application 64 on the external computing device 200, which updates its own screen buffer accordingly.

User input events in the device simulator are sent over the connection 202 to the mobile device 10, where they are then injected into the message queue. It can be seen that the input from the external computing device 200 (through display and keyboard modules 212, 213 respectively) is transmitted to and received by the mobile device 10 and the display updates on the mobile device 10 are transmitted back to the external computing device 200 to update the larger display screen 208. This approach is relatively simple to implement and can utilize the standard features on the mobile device 10 such as automatic text completion, etc. Since the external computing device 200 is mirroring the mobile device's screen buffer, additional consideration may be needed to make the display on the external computing device 200 larger than the display on the mobile device 10, namely there should be a resealing and resizing of the actual output displayed on the screen 208. Any solution for rescaling can be used such as bi-cubic scaling or designing applications such that they are larger than what would be displayed on the mobile device 10 so that the additional area can be utilized during a simulation.

It may be noted that in most cases, a zoom-in of the UI to enlarge it would be sufficient, however, this would still utilize only a portion of the display screen 208. By using a hybrid approach, the simulator 236 can be used for those applications 80 that have either just been added or not yet configured to be used through the HTTP server application 250b (i.e. to temporarily mirror an application 80).

Another way to implement the mirrored configuration may involve duplicating the mobile device's software in the device simulator 236 on the external computing device 200, using the connection 202, to mirror flash memory changes between the device simulator and the mobile device 10. This configuration may be considered a file system mirrored configuration, and should operate more efficiently than the display mirrored system shown in FIG. 14. However, it may be appreciated that mirroring flash writes can make the implementation more technically complicated. Further consideration should be made when implementing this configuration as the device simulator requires access to the mobile device radios (cellular, BT, WLAN, GPS), uSD card, etc. Also, the version of the device simulator software would need to match the mobile device 10.

Rather than mirroring the mobile device 10 in the way shown in FIG. 14, another approach is to re-write the user interface of an application that is native to the mobile device 10, for the PC or "desktop" environment. This would enable the user to take full advantage of the screen 208 and the input methodology. However, it can be appreciated that considerably more development effort would be required to implement each application for the PC environment, and 3$^{rd}$ party applications would require farther special considerations.

As can be appreciated, the native UI embodiment would require a native UI application suite on the external computing device 200 and a UI data driver on the mobile device 10. This would provide the user with a native look and feel, however, this would result in a significantly large client application (e.g. in the UI application suite), and there could be considerations in avoiding a skew between the versions in the external computing device 200 client and the mobile device 10. This would be caused by upgrades to the mobile device 10 applications that would not yet be realized on the PC side as noted above.

Figure 15:
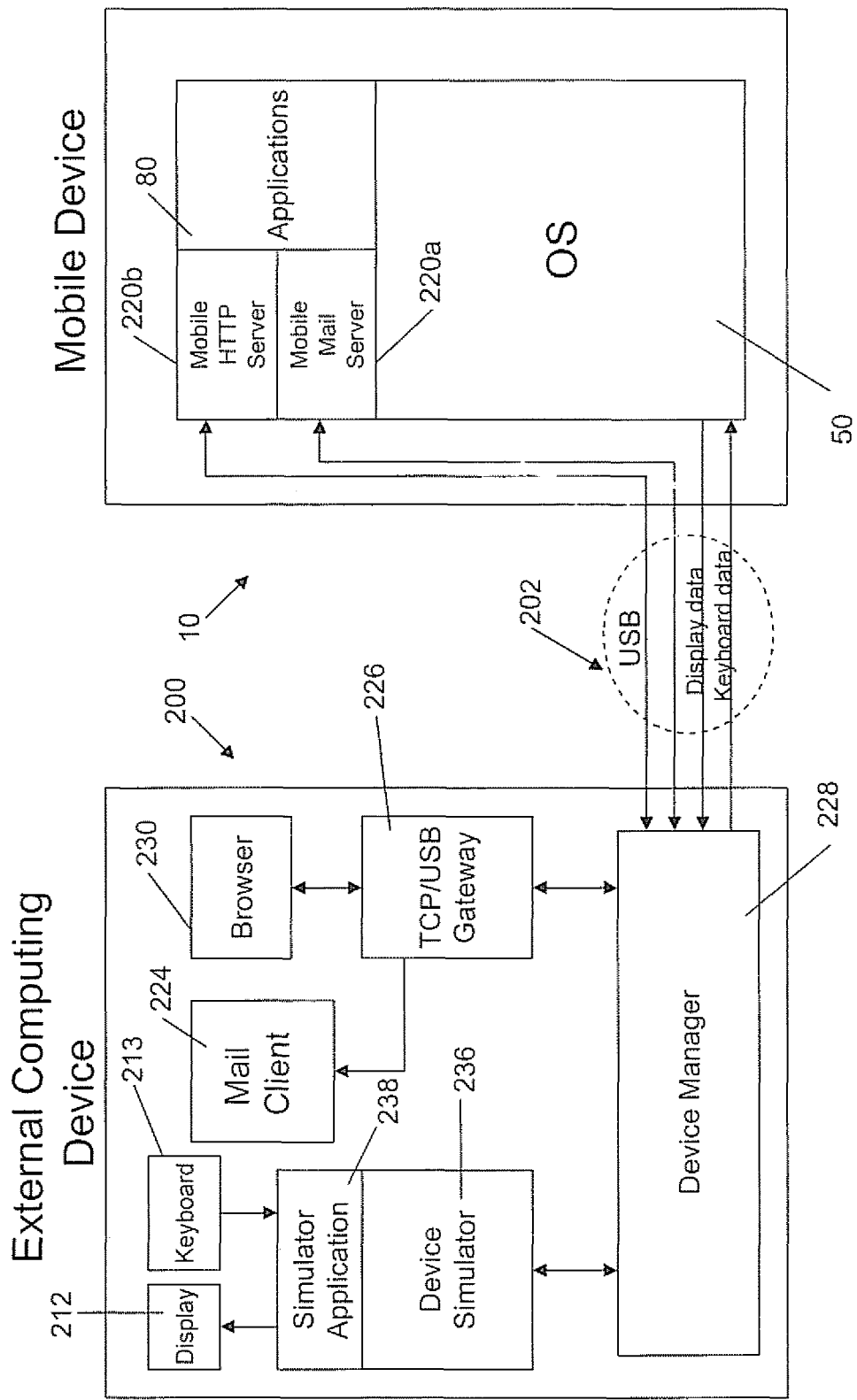
FIG. 15 is a schematic diagram illustrating the hybrid embodiment of FIG. 14 utilizing a mail server for email applications.
Figure 16:
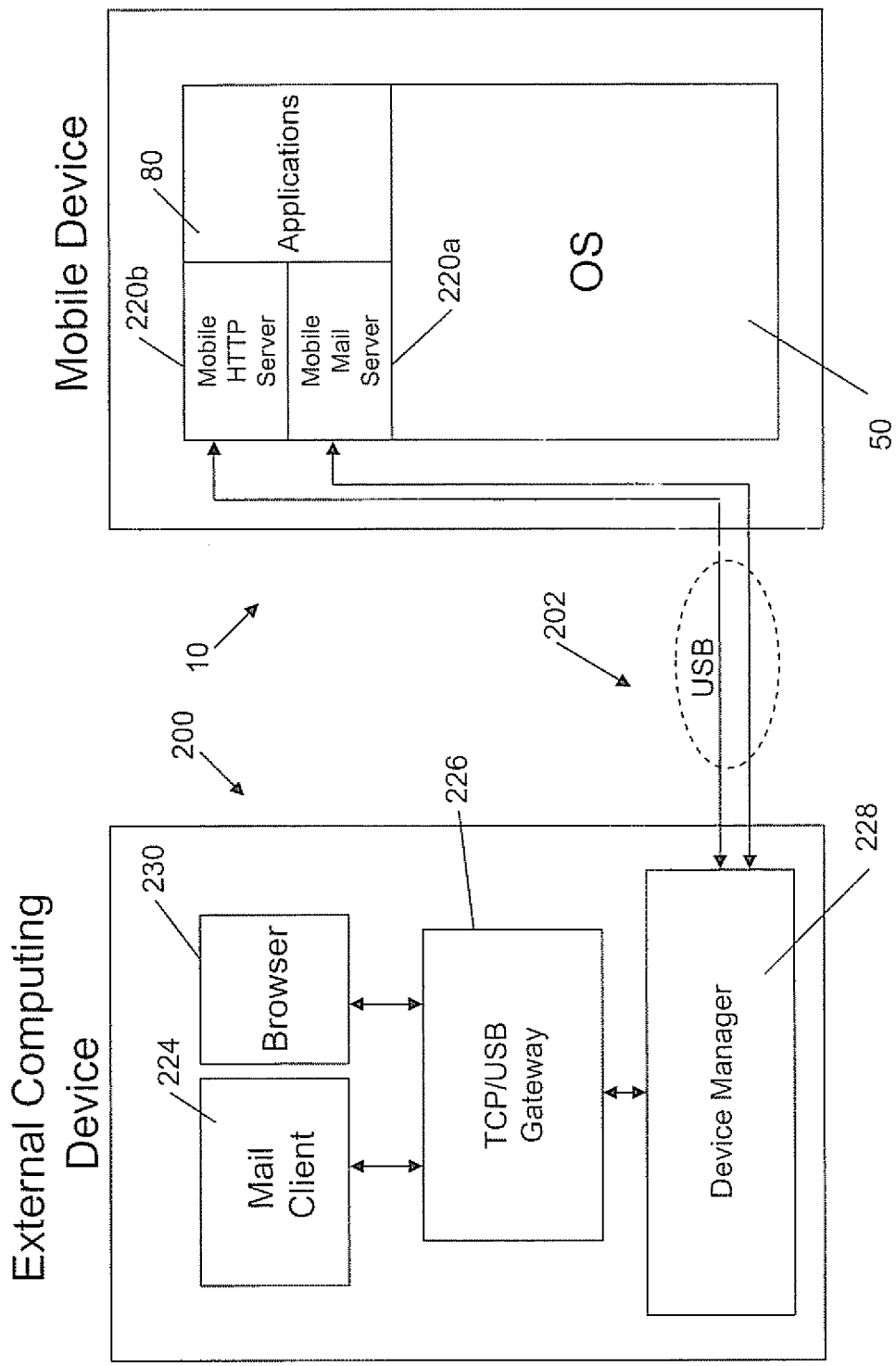
FIG. 16 is a schematic diagram of yet another embodiment for interfacing between a mobile device and an external computing device which utilizes a hybrid of the embodiments of FIGS. 9 and 11.

Other hybrid configurations can also be used as shown in FIGS. 15 and 16. In FIG. 15 it can be seen that both a mobile HTTP server 220b and email server 220a are provided by the mobile device 200 so that the user can utilize both the browser 230 and email client 224 on the external computing device 200 through the TCP/USB gateway 226. This hybrid configuration would give a more familiar feel to the email experience if the user is more comfortable with their email client UI while still enabling other applications 80 to be simulated on the mobile HTTP server 220b, e.g. for calendar 84. Also shown in FIG. 15 is the display mirror configuration that can optionally be added to accommodate applications 80 that have not yet been updated to the mobile HTTP server 220b. FIG. 16 shows a hybrid solution where the display mirror is not used, only the mobile HTTP server 220b and email server 220a. This would enable the user to access email consistently by having the email server 220a operating on their mobile device 10 while adding access to other applications 80 through the mobile HTTP server 220b which can be updated over time.

It can therefore be seen that there are several configurations that can be used to interface between the mobile device 10 and the external computing device 200. In general, the configuration should be chosen to best suit the application requirements and the particular environment. It can also be seen that by interfacing with the external computing device 200 in one or more of the ways exemplified above, operations typically performed on the mobile device 10 can be hosted by the external computing device 200 to increase efficiencies in mobile communications. Also, in this way, the mobile device's wireless connectivity for effecting data communications can be used in conjunction with the convenient features of the external computing device 200 without requiring that the external computing device 200 have the same connectivity. In other words, as noted above, the user can take advantage of the wireless communication capabilities of the mobile device 10 while using the external device's input/output facilities. The mobile device 10 then can offer additional functionality to the external computing device 200 and vice versa. As such, if the external computing device 200 has no Internet connectivity, the mobile device 10 can provide this to the user using one or more of the above configurations.

Figure 17:
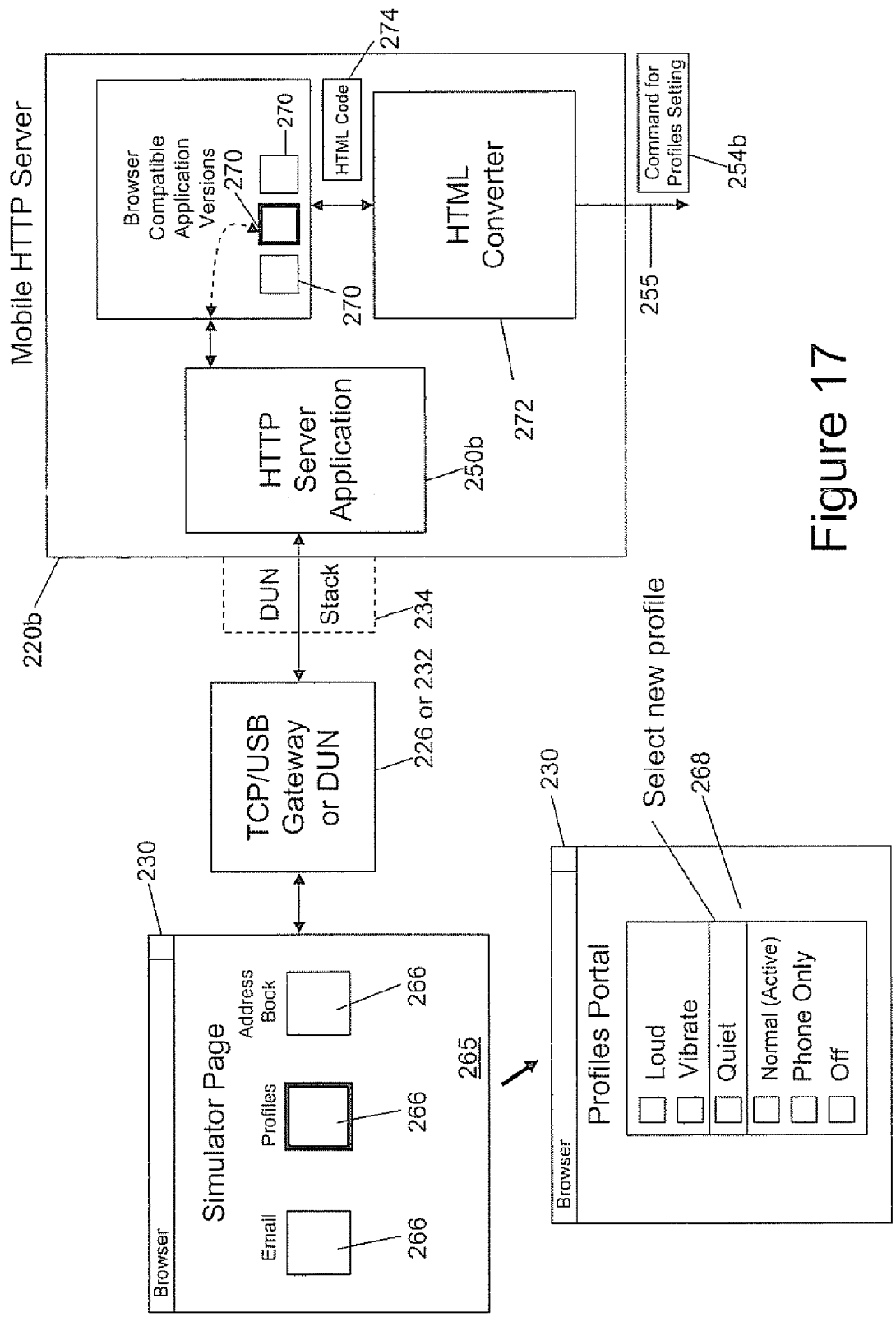
FIG. 17 is a schematic diagram of another example of using the configuration shown in FIG. 13 for changing settings on the mobile device through the external computing device.

As discussed above, the connection 202 established between the external computing device 200 and the mobile device 10 can also enable a user to access and change/update settings on the mobile device 10 while they are using the external computing device 200. For example, a user who normally connects their mobile device 10 to their PC while in their office can use their browser 230 to access their profile settings as shown in FIG. 17. This enables the user to change their profile to the "Quiet" setting before disconnecting their mobile device 10 and taking it to a meeting. Rather than disconnecting the mobile device 10 and then entering the settings through the mobile device 10, the user can conveniently make the changes while the mobile device 10 is still connected. As can be seen in FIG. 17, upon changing the profile setting to "Quiet" through the browser 230, the HTML code associated with this user interaction would be converted by the HTML converter 272 to a command for the profiles setting 254b, which is sent to or applied to the profiles application 86 residing on the mobile device 10.

The use of the connection 202 and configurations discussed above can also be extended to interacting with other programs on the mobile device 10 such as for updating contact information, setting favorites and directions in a map program, participating in a mobile device-based instant messaging session, utilizing other wireless communications facilities, etc. It can therefore be seen that the provision of a mobile server 220 on the mobile device 10 can allow the user to take advantage of the convenience of the external computing device 200 to not only facilitate data entry (e.g. creating mail messages) and enable the use of native programs, but also to access and change mobile device settings more conveniently through the portal that can be created (e.g. through browser 230).

It will be appreciated that the particular options, outcomes, applications, screen shots and icons shown in the figures and described above are for illustrative purposes only and many other variations can be used according to the principles described.

Although the above has been described with reference to certain specific embodiments, various modifications thereof will be apparent to those skilled in the art as outlined in the appended claims.

The invention claimed is:

1. A method enabling interactions with a mobile device using an external computing device, said method comprising:
providing a mobile server on said mobile device to resemble an existing entity normally communicated with by an application on said external computing device and normally residing outside of said mobile device, said mobile server configured to enable said application on said external computing device to communicate with said mobile server as if said mobile server was said existing entity;

enabling a communication connection to be established between said mobile device and said external computing device, said mobile device and said external computing device being in proximity of each other;

enabling said application on said external computing device to communicate with said mobile server during said communication connection; and sending to a user interface (UI) of said application on said external computing device during said communication connection, at least one communication sent or received by a communication application residing on said mobile device to update said UI of said application on said external computing device as if said UI of said application on said external computing device was accessing said existing entity and to enable said application on said external computing device to be used to interact with said communication application residing on said mobile device.

2. The method according to claim 1 wherein said mobile server provides an email server application and said application on said external computing device is an email client, said email server application being configured to access email messages stored on said mobile device and to provide said email messages to said email client.

3. The method according to claim 1 wherein said mobile server provides an HTTP server application and said application on said external computing device is a browser, said HTTP server application being configured to convert data on said mobile device to a format compatible with said browser, said data from said communication application residing on said mobile device being provided to said UI through a portal hosted by said HTTP server.

4. The method according to claim 3 wherein said HTTP server application communicates with said browser over a dial-up-networking (DUN) connection.

5. The method according to claim 1 wherein said mobile server provides an email server application and provides an HTTP server and said application on said external computing device is a browser or email client or both, said email server application being configured to access email messages stored on said mobile device and to provide said email messages to said email client, said HTTP server application being configured to convert data on said mobile device to a format compatible with said browser, said data from said communication application residing on said mobile device being provided to said UI through a portal hosted by said HTTP server.

6. The method according to claim 1 wherein said communication application residing on said mobile device includes one or more options for changing settings on said mobile device, and said mobile server is configured to receive updates to said settings from said application on said external computing device and generate a command for updating said settings on said mobile device.

7. A method for interacting with a mobile device using an external computing device, said method comprising:

enabling a communication connection to be established between said external computing device and said mobile device, said external computing device and said mobile device being in proximity of each other;

enabling an application on said external computing device to communicate with a mobile server on said mobile device during said communication connection, said mobile server resembling an existing entity normally communicated with by said application on said external computing device and normally residing outside of said mobile device, said mobile server being configured to enable said application to communicate with said mobile server as if said mobile server was said existing entity;

said external computing device receiving at least one communication sent to or received by a communication application residing on said mobile device, from said mobile server, during said communication connection;

said external computing device updating a user interface (UI) of said application on said external computing device as if said UI of said application on said external computing device was accessing said existing entity to enable said application on said external computing device to be used to interact with said communication application residing on said mobile device.

8. The method according to claim 7 wherein said mobile server provides an email server application and said application on said external computing device is an email client, said email server application being configured to access email messages stored on said mobile device and to provide said email messages to said email client.

9. The method according to claim 7 wherein said mobile server provides an HTTP server application and said application on said external computing device is a browser, said HTTP server application being configured to convert data on said mobile device to a format compatible with said browser, said data from said communication application residing on said mobile device being provided to said UI through a portal hosted by said HTTP server.

10. The method according to claim 9 wherein said HTTP server communicates with said browser over a dial-up-networking (DUN) connection.

11. The method according to claim 7 comprising providing a device simulator which acts as a proxy for a display and input mechanism on said mobile device such that as said display is updated, said device simulator receives from said mobile device, buffer data over said communication connection and updates a corresponding screen buffer accordingly.

12. The method according to claim 7 wherein said communication application residing on said mobile device includes one or more options for changing settings on said mobile device, and said UI enables a user to change said settings using said application on said external computing device such that said mobile server can generate a command for updating said settings on said mobile device.

13. A computer readable tangible medium comprising computer executable instructions for enabling interactions with a mobile device using an external computing device comprising instructions for:

providing a mobile server on said mobile device to resemble an existing entity normally communicated with by an application on said external computing device and normally residing outside of said mobile device, said mobile server configured to enable said application on said external computing device to communicate with said mobile server as if said mobile server was said existing entity;

enabling a communication connection to be established between said mobile device and said external computing device, said mobile device and said external computing device being in proximity of each other;

enabling said application on said external computing device to communicate with said mobile server during said communication connection; and sending to a user interface (UI) of said application on said external computing device during said communication connection, at least one communication sent or received by a communication application residing on said mobile device to update said UI of said application on said external computing device as if said UI of said application on said external computing device was accessing said existing entity and to enable said application on said external computing device to be used to interact with said communication application residing on said mobile device.

14. The computer readable tangible medium according to claim 13 wherein said instructions comprise instructions to have said mobile server provide an email server application, said application on said external computing device being an email client, said email server application being configured to access email messages stored on said mobile device and to provide said email messages to said email client.

15. The computer readable tangible medium according to claim 13 wherein said instructions comprise instructions to have said mobile server provide an HTTP server application, said application on said external computing device being a browser, said HTTP server application being configured to convert data on said mobile device to a format compatible with said browser, said data from said communication application residing on said mobile device being provided to said UI through a portal hosted by said HTTP server.

16. The computer readable tangible medium according to claim 15 wherein said HTTP server application communicates with said browser over a dial-up-networking (DUN) connection.

17. The computer readable tangible medium according to claim 13 wherein said instructions comprise instructions to have said mobile server provide an email server application and to provide an HTTP server, said application on said external computing device being a browser or email client or both, said email server application being configured to access email messages stored on said mobile device and to provide said email messages to said email client, said HTTP server application being configured to convert data on said mobile device to a format compatible with said browser, said data from said communication application residing on said mobile device being provided to said UI through a portal hosted by said HTTP server.

18. The computer readable tangible medium according to claim 13 wherein said communication application residing on said mobile device includes one or more options for changing settings on said mobile device, and said mobile server is configured to receive updated to said settings from said application on said external computing device and generate a command for updating said settings on said mobile device.

19. A computer readable tangible medium comprising computer executable instructions for interacting with a mobile device using an external computing device comprising instructions for:
enabling a communication connection to be established between said external computing device and said mobile device, said external computing device and said mobile device being in proximity of each other;
enabling an application on said external computing device to communicate with a mobile server on said mobile device during said communication connection, said mobile server resembling an existing entity normally communicated with by said application on said external computing device and normally residing outside of said mobile device, said mobile server being configured to enable said application to communicate with said mobile server as if said mobile server was said existing entity;
said external computing device receiving at least one communication sent to or received by a communication application residing on said mobile device, from said mobile server, during said communication connection;
said external computing device updating a user interface (UI) of said application on said external computing device as if said UI of said application on said external computing device was accessing said existing entity to enable said application on said external computing device to be used to interact with said communication application residing on said mobile device.

20. The computer readable tangible medium according to claim 19 wherein said instructions comprise instructions to have said mobile server provide an email server application, said application on said external computing device being an email client, said email server application being configured to access email messages stored on said mobile device and to provide said email messages to said email client.

21. The computer readable tangible medium according to claim 19 wherein said instructions comprise instruction to have said mobile server provide an HTTP server application, said application on said external computing device being a browser, said HTTP server application being configured to convert data on said mobile device to a format compatible with said browser, said data from said communication application residing on said mobile device being provided to said UI through a portal hosted by said HTTP server.

22. The computer readable tangible medium according to claim 21 wherein said HTTP server communicates with said browser over a dial-up-networking (DUN) connection.

23. The computer readable tangible medium according to claim 19 wherein said instructions comprises instructions to provide a device simulator which acts as a proxy for a display and input mechanism on said mobile device such that as said display is updated, said device simulator receives from said mobile device, buffer data over said communication connection and updates a corresponding screen buffer accordingly.

24. The computer readable tangible medium according to claim 19 wherein said communication application residing on said mobile device includes one or more options for changing settings on said mobile device, and said UI enables a user to change said settings using said existing application on said external computing device such that said mobile server can generate a command for updating said settings on said mobile device.

25. A mobile device comprising a processor and memory, said memory comprising computer executable instructions for enabling interactions with said mobile device using an external computing device, said computer executable instructions comprising instructions for:
providing a mobile server on said mobile device to resemble an existing entity normally communicated with by an application on said external computing device and normally residing outside of said mobile device, said mobile server configured to enable said application on said external computing device to communicate with said mobile server as if said mobile server was said existing entity;
enabling a communication connection to be established between said mobile device and said external computing device, said mobile device and said external computing device being in proximity of each other;
enabling said application on said external computing device to communicate with said mobile server during said communication connection; and
sending to a user interface (UI) of said application on said external computing device during said communication connection, at least one communication sent or received by a communication application residing on said mobile device to update said UI of said application on said external computing device as if said UI of said application on said external computing device was accessing said existing entity and to enable said application on said external computing device to be used to interact with said communication application residing on said mobile device.

26. The mobile device according to claim 25 wherein said mobile server provides an email server application and said application on said external computing device is an email client, said email server application being configured to access email messages stored on said mobile device and to provide said email messages to said email client.

27. The mobile device according to claim 25 wherein said mobile server provides an HTTP server application and said application on said external computing device is a browser, said HTTP server application being configured to convert data on said mobile device to a format compatible with said browser, said data from said communication application residing on said mobile device being provided to said UI through a portal hosted by said HTTP server.

28. The mobile device according to claim 27 wherein said HTTP server application communicates with said browser over a dial-up-networking (DUN) connection.

29. The mobile device according to claim 25 wherein said mobile server provides an email server application and provides an HTTP server and said application on said external computing device is a browser or email client or both, said email server application being configured to access email messages stored on said mobile device and to provide said email messages to said email client, said HTTP server application being configured to convert data on said mobile device to a format compatible with said browser, said data from said communication application residing on said mobile device being provided to said UI through a portal hosted by said HTTP server.

30. The mobile device according to claim 25 wherein said communication application residing on said mobile device includes one or more options for changing settings on said mobile device, and said mobile server is configured to receive updates to said settings from said application on said external computing device and generate a command for updating said settings on said mobile device.

31. An external computing device comprising a processor and memory, said memory comprising computer executable instructions for interacting with a mobile device using said external computing device, said computer executable instructions comprising instructions for:
enabling a communication connection to be established between said external computing device and said mobile device, said external computing device and said mobile device being in proximity of each other;
enabling an application on said external computing device to communicate with a mobile server on said mobile device during said communication connection, said mobile server resembling an existing entity normally communicated with by said application on said external computing device and normally residing outside of said mobile device, said mobile server being configured to enable said application to communicate with said mobile server as if said mobile server was said existing entity;
said external computing device receiving at least one communication sent to or received by a communication application residing on said mobile device, from said mobile server, during said communication connection;
said external computing device updating a user interface (UI) of said application on said external computing device as if said UI of said application on said external computing device was accessing said existing entity to enable said application on said external computing device to be used to interact with said communication application residing on said mobile device.

32. The external computing device according to claim 31 wherein said mobile server provides an email server application and said application on said external computing device is an email client, said email server application being configured to access email messages stored on said mobile device and to provide said email messages to said email client.

33. The external computing device according to claim 31 wherein said mobile server provides an HTTP server application and said application on said external computing device is a browser, said HTTP server application being configured to convert data on said mobile device to a format compatible with said browser, said data from said communication application residing on said mobile device being provided to said UI through a portal hosted by said HTTP server.

34. The external computing device according to claim 33 wherein said HTTP server communicates with said browser over a dial-up-networking (DUN) connection.

35. The external computing device according to claim 31 comprising a device simulator which acts as a proxy for a display and input mechanism on said mobile device such that as said display is updated, said device simulator receives from said mobile device, buffer data over said communication connection and updates a corresponding screen buffer accordingly.

36. The external computing device according to claim 31 wherein said communication application residing on said mobile device includes one or more options for changing settings on said mobile device, and said UI enables a user to change said settings using said application on said external computing device such that said mobile server can generate a command for updating said settings on said mobile device.

* * * * *